US012627847B2

(12) United States Patent
Chiba et al.

(10) Patent No.: US 12,627,847 B2
(45) Date of Patent: May 12, 2026

(54) VIDEO DISTRIBUTION SYSTEM, VIDEO DISTRIBUTION CONTROL METHOD, AND STORAGE MEDIUM

(71) Applicant: KONAMI DIGITAL ENTERTAINMENT CO., LTD., Tokyo (JP)

(72) Inventors: Shigeru Chiba, Tokyo (JP); Junki Hirai, Tokyo (JP); Kai Inoue, Tokyo (JP); Akira Sakai, Tokyo (JP); Tsuguo Shinpo, Tokyo (JP); Toshiaki Kanahara, Tokyo (JP); Yoshihiko Narita, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 730 days.

(21) Appl. No.: 17/946,620

(22) Filed: Sep. 16, 2022

(65) Prior Publication Data

US 2023/0013365 A1     Jan. 19, 2023

Related U.S. Application Data

(63) Continuation of application No. PCT/JP2021/008467, filed on Mar. 4, 2021.

(30) Foreign Application Priority Data

Mar. 27, 2020    (JP) ................................. 2020-057702
Mar. 27, 2020    (JP) ................................. 2020-057725

(51) Int. Cl.
*H04N 21/266*     (2011.01)
*A63F 13/86*     (2014.01)
*H04N 21/6332*     (2011.01)

(52) U.S. Cl.
CPC ........... *H04N 21/266* (2013.01); *A63F 13/86* (2014.09); *H04N 21/6332* (2013.01)

(58) Field of Classification Search
None
See application file for complete search history.

(56) References Cited

U.S. PATENT DOCUMENTS

2018/0165887 A1*   6/2018   Iwai ........................ A63F 13/86

FOREIGN PATENT DOCUMENTS

CN     109937394 A     6/2019
JP     10-161960 A     6/1998
(Continued)

OTHER PUBLICATIONS

Machine Translation for JP-2019036786-A. (Year: 2019).*
(Continued)

*Primary Examiner* — Junior O Mendoza
(74) *Attorney, Agent, or Firm* — Sughrue Mion, PLLC

(57) ABSTRACT

In a video distribution system comprising a relay server that relays and distributes video to be viewed distributed from a predetermined distribution source to a user terminal device used by each of a plurality of users, a distribution base is set in the relay server as a unit for relaying and distributing video to the user terminal device after obtaining permission from the distribution source, and the video from the distribution source is relayed and distributed to the user terminal device of a user via the distribution base used by the user.

11 Claims, 12 Drawing Sheets

(56) References Cited

FOREIGN PATENT DOCUMENTS

| | | | |
|---|---|---|---|
| JP | 2013-168004 | A | 8/2013 |
| JP | 2015-188176 | A | 10/2015 |
| JP | 5912039 | B2 | 4/2016 |
| JP | 2017-502436 | A | 1/2017 |
| JP | 6180802 | B2 | 8/2017 |
| JP | 6203369 | B1 | 9/2017 |
| JP | 2018-026152 | A | 2/2018 |
| JP | 2018-097427 | A | 6/2018 |
| JP | 2019036786 | A | * 3/2019 |
| JP | 2019-536131 | A | 12/2019 |

OTHER PUBLICATIONS

Japanese Office Action issued Aug. 29, 2023 in Application No. 2022-140448.

International Search Report dated Jun. 8, 2021 from the International Searching Authority in International Application No. PCT/JP2021/008467.

Written Opinion dated Jun. 8, 2021 from the International Searching Authority in International Application No. PCT/JP2021/008467.

Notification of Reasons for Refusal dated May 24, 2021 from the Japanese Patent Office in JP Application No. 2020-057702.

Notification of Reasons for Refusal dated Dec. 10, 2021 from the Japanese Patent Office in JP Application No. 2020-057702.

Notification of Reasons for Refusal dated May 24, 2021 from the Japanese Patent Office in JP Application No. 2020-057725.

Notification of Reasons for Refusal dated Dec. 27, 2021 from the Japanese Patent Office in JP Application No. 2020-057725.

Notification of Reasons for Refusal dated Jul. 8, 2022 from the Japanese Patent Office in JP Application No. 2020-057725.

Notification of Reasons for Refusal dated Feb. 1, 2022 from the Japanese Patent Office in JP Application No. 2020-057743.

Notification of Reasons for Refusal dated May 6, 2022 from the Japanese Patent Office in JP Application No. 2020-057743.

Korean Office Action dated Jul. 18, 2024 in Application No. 10-2022-7029406.

Communication dated Feb. 14, 2026 in Chinese Application No. 202180024585.9.

* cited by examiner

Distribution video (Video designation, Distribution date and time)
Member (Direct designation, Attribute, Number of people, …)
Internal configuration (Virtual monitor, interior finishing, Furnishings…)
Advertisement (Selection, Display, Discount…)
Event (Ranking setting…)

Time

Fig. 9
D23
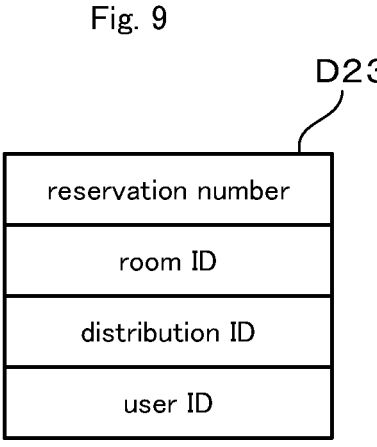
Fig. 10
TB1
| room ID | | | |
|---|---|---|---|
| viewer1 | user ID | location information | user information |
| viewer2 | user ID | location information | user information |
| viewer3 | user ID | location information | user information |
Fig. 11
D24
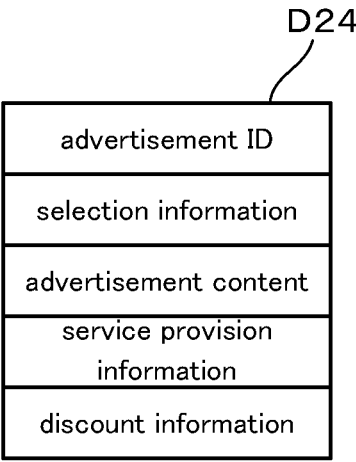

Fig. 13

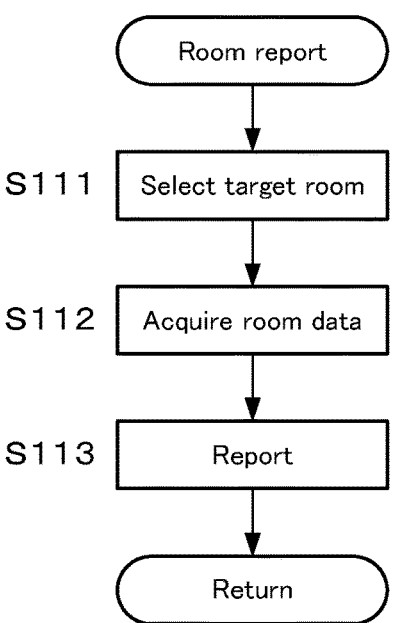

```
                    ( Room report )
                          │
                          ▼
S111          ┌─────────────────────┐
              │  Select target room │
              └─────────────────────┘
                          │
                          ▼
S112          ┌─────────────────────┐
              │  Acquire room data  │
              └─────────────────────┘
                          │
                          ▼
S113          ┌─────────────────────┐
              │        Report       │
              └─────────────────────┘
                          │
                          ▼
                    (    Return    )
```

Fig. 14

```
                    ( Room entry
                      management )
                          │
                          ▼
S121          ┌─────────────────────┐
              │  Select virtual room│
              └─────────────────────┘
                          │
                          ▼
S122      ⟨ Is entry requirement ⟩───────────────┐
          ⟨        met ?          ⟩   No          │
                   Yes                            ▼
                    │                 S126  ┌──────────────────┐
                    ▼                       │ Not permit entry │
S123     ┌─────────────────────┐           └──────────────────┘
         │    Permit entry     │                  │
         └─────────────────────┘                  │
                    │                             │
                    ▼                             │
S124     ┌─────────────────────┐                 │
         │ Register in viewer list│              │
         └─────────────────────┘                 │
                    │                             │
                    ▼                             │
S125     ┌─────────────────────┐                 │
         │ Start display of image│               │
         └─────────────────────┘                 │
                    │                             │
                    ▼◄────────────────────────────┘
                    (    Return    )
```

S201 | Select advertisement

S202 | Display advertisement

VIDEO DISTRIBUTION SYSTEM, VIDEO DISTRIBUTION CONTROL METHOD, AND STORAGE MEDIUM

TECHNICAL FIELD

The present invention relates to a video distribution system and the like for distributing a video to be viewed to a user terminal device.

BACKGROUND ART

An information processing system for displaying a video playing back a play of a game on a virtual television device disposed in a three-dimensional virtual space, disposing a character associated with a user in the virtual space, and displaying a comment contributed by the user as a comment of the character is known (for example, see Patent Literature 1). A system for providing a virtual room for each user to allow the user to view various videos through a virtual screen therein, disposing an avatar corresponding to the user in the virtual room, and enabling the avatar to visit a virtual room of another user is also known (for example, see Patent Literature 2).

PRIOR ART DOCUMENTS

Patent Literature

Patent Literature 1: JP6180802B
Patent Literature 2: JP6203369B

SUMMARY OF INVENTION

Technical Problem

It is possible to allow a plurality of users to view a video while sharing the same virtual space in a conventional video distribution system. However, when the scale of the number of users and the like that can view the video together is expanded limitlessly, there is a possibility that the feeling of sharing a place for viewing videos is conversely diminished. For example, it is sometimes difficult to ensure communication between users. When such a difficulty occurs, it is convenient to set the range of the user group sharing the place for viewing comparatively small. However, when limiting the distribution destination from the distribution source to such a small-scale group, it is necessary to set up a large number of distribution destinations on the distribution source end in order to increase the total number of views, which increases the burden required for setup and management thereof.

Furthermore, there is room for improvement in the conventional system as relating to what manner of users to draw to the virtual space. For example, in the real world, various commercial activities are deployed that provide a place where viewers can watch videos together, such as public screenings and sports bars, and the customer attraction effect leads to commercial opportunities such as product sales. The systems taught in the patent literatures described above are not necessarily suited to such activities.

Therefore, an object of a first aspect of the present invention is to provide a video distribution system and the like capable of appropriately setting up a place for viewing a video while reducing burden on the distribution source. Furthermore, an object of a second aspect of the present invention is to provide a video distribution system and the like capable of providing a place for a desired range of users to gather a view a video together.

Solution to Problem

The video distribution system according to the first aspect of the present invention is video distribution system comprising a computer provided with a relay unit for relaying and distributing a video to be viewed which is distributed from a predetermined distribution source to a user terminal device used by each of a plurality of users, wherein the computer serves as: a distribution base setup unit that obtains permission from the distribution source and sets up, on the relay unit, a distribution base as a unit for relaying and distributing the video to the user terminal device; and a viewing control unit that relays and distributes the video from the distribution source to the user terminal device of a user via the distribution base used by the user.

The video distribution control method according to the first aspect of the present invention is a video distribution control method applied to a video distribution system provided with a relay unit for relaying and distributing a video to be viewed which is distributed from a predetermined distribution source to a user terminal device used by each of a plurality of users, wherein the video distribution control method includes: a step that obtains permission from the distribution source and sets up, on the relay unit, a distribution base as a unit for relaying and distributing the video to the user terminal device; and a step that relays and distributes the video from the distribution source to the user terminal device of a user via the distribution base used by the user.

The non-transitory computer readable storage medium according to the first aspect of the present invention stores a computer program applied to a video distribution system provided with a relay unit for relaying and distributing a video to be viewed which is distributed from a predetermined distribution source to a user terminal device used by each of a plurality of users, wherein the computer program is configured to cause a computer of the video distribution system to function as: a distribution base setup unit that obtains permission from the distribution source and sets up, on the relay unit, a distribution base as a unit for relaying and distributing the video to the user terminal device; and a viewing control unit that relays and distributes the video from the distribution source to the user terminal device of a user via the distribution base used by the user.

The video distribution system according to the second aspect of the present invention is a video distribution system comprising a computer provided with a distribution unit in which a distribution base that can be shared by at least two users is set up as a unit for distributing a video, the video distribution system being for distributing the video to be viewed from the distribution unit to a user terminal device used by each of a plurality of users, wherein the computer serves as: a virtual space setup unit that sets up and associates with the distribution base a virtual space including a virtual monitor for displaying the video, such that at least a portion of specifications that characterize the virtual space are defined based on an instruction from a predetermined setter; and a viewing control unit that displays, on user terminal devices of a user group sharing same one distribution base, a moving image expressing a state of viewing the video via the virtual monitor in the virtual space associated with the distribution base.

The video distribution control method according to the second aspect of the present invention is a video distribution control method applied to a video distribution system provided with a distribution unit in which a distribution base that can be shared by at least two users is set up as a unit for distributing a video, the video distribution system being for distributing the video to be viewed from the distribution unit to a user terminal device used by each of a plurality of users, wherein the video distribution control method includes: a step that sets up and associates with the distribution base at least one virtual space including a virtual monitor for displaying the video, such that at least a portion of specifications that characterize the virtual space are defined based on an instruction from a predetermined setter; and a step that displays, on user terminal devices of a user group sharing same one distribution base, a moving image expressing a state of viewing the video via the virtual monitor in the virtual space associated with the distribution base.

The non-transitory computer readable storage medium according to the second aspect of the present invention stores a computer program applied to a video distribution system provided with a distribution unit in which a distribution base that can be shared by at least two users is set up as a unit for distributing a video, the video distribution system being for distributing the video to be viewed from the distribution unit to a user terminal device used by each of a plurality of users, wherein the computer program is configured to cause a computer of the video distribution system to function as: a virtual space setup unit that sets up and associates with the distribution base at least one virtual space including a virtual monitor for displaying the video, such that at least a portion of specifications that characterize the virtual space are defined based on an instruction from a predetermined setter; and a viewing control unit that displays, on user terminal devices of a user group sharing same one distribution base, a moving image expressing a state of viewing the video via the virtual monitor in the virtual space associated with the distribution base.

BRIEF DESCRIPTION OF DRAWINGS

FIG. 9 is a diagram illustrating one example of a configuration of viewing reservation data.

FIG. 10 is a diagram illustrating one example of a configuration of a viewer list.

FIG. 11 is a diagram illustrating one example of a configuration of advertisement data.

FIG. 13 is a flowchart illustrating one example of a procedure of a room report process.

FIG. 14 is a flowchart illustrating one example of a procedure of a room entry management process.

DESCRIPTION OF EMBODIMENTS

Figure 1:
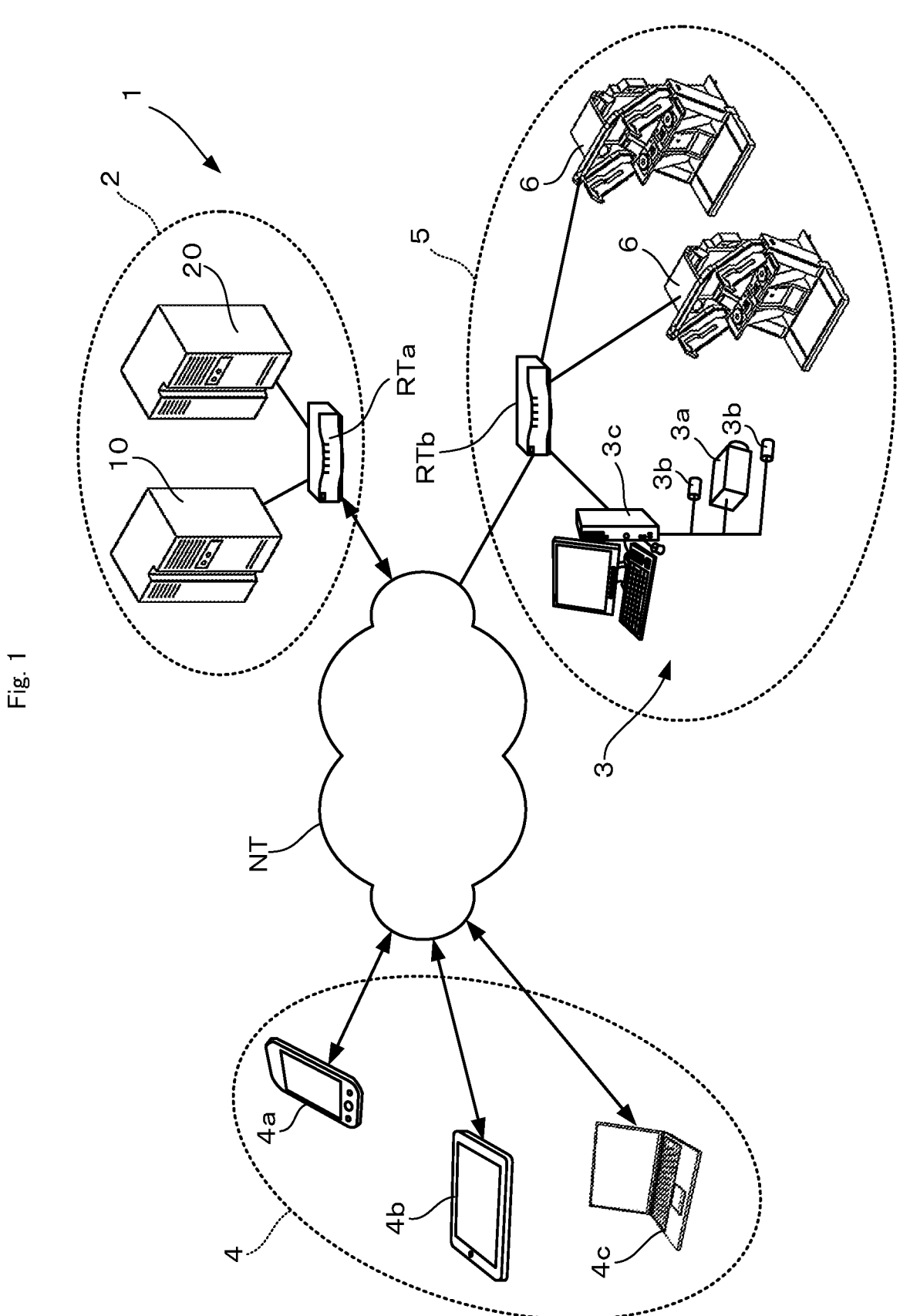
FIG. 1 is a perspective view illustrating one example of a network system including a video distribution system according to one embodiment of the present invention.

A video distribution system according to one embodiment of the present invention will be described below with reference to the attached drawings. Incidentally, unless otherwise specifically stated in the present specification, the term video is used as a concept that may include sound. Moreover, regardless of whether the video includes audio or not, an act of viewing the video is expressed as viewing. As illustrated in FIG. 1, a video distribution system 1 includes a distribution server 2 as one example of the distribution unit for distributing a video to be viewed. The distribution server 2 acquires a video captured by a capturing system 3, for example, and distributes the obtained video image to a user terminal device 4 via a network NT.

The distribution server 2 includes a distribution source server 10 as one example of a distribution source and a relay server 20 as one example of the relay unit for relaying a video distributed from the distribution source server 10 and distributing the video to the user terminal device 4. The distribution source server 10 and the relay server 20 need not necessarily be configured as server units physically distinguished from each other. The distribution source server 10 and the relay server 20 may be distinguished logically. Conversely, the distribution server 2 itself may be configured by appropriately combining a plurality of server units or may be configured from a single server unit. The distribution server 2 may be configured as a cloud server that uses cloud computing technology. One example of the network NT is the Internet. The distribution server 2 may be connected to the network NT via an appropriate router RTa.

The capturing system 3 includes, for example, a video camera 3a and microphone 3b for video capture, and a PC (abbreviation for personal computer; the same applies hereinafter) 3c for encoding and transmitting the obtained video. The capturing system 3 may further include equipment such as a mixer for adjusting or processing video, but illustrations thereof are omitted. The capturing system 3 may be provided to capture an appropriate video. As one example, in FIG. 1, a situation in which a game is played on a game machine 6 installed in a facility 5 such as an event site, store, or the like is captured by the capturing system 3. One example of the game machine 6 is a commercial game machine configured so as to play the game in exchange for payment of a play fee. This type of game machine 6 is also called an arcade game machine. However, the game machine 6 need not be controlled so as to always collect the charge. For example, at the time of an event such as a game tournament, the game machine 6 may operate such that participants in the event may play the game for free. The game provided by the game machine 6 may be appropriately selected. That to be captured by the capturing system 3 is not limited to play of a game, and examples may include various events such as a sports event or a concert.

A PC 3*c* of the capturing system 3 is connected to the network NT via the router RTb disposed in the facility 5. Thus, the PC 3*c* can operate as a client of the distribution server 2. Additionally, the game machine 6 may be connected to the network NT via the router RTb. However, the game machine 6 need not necessarily be connected to the distribution server 2. For example, the game machine 6 may be connected via the network NT to a game server (not illustrated) for managing the game. The game machine 6 is connected to the PC 3*c*, images and the like displayed on the game machine 6 are acquired by the PC 3*c* in accordance with the video captured by the camera 3*a* and the like, and data of a video having the images and the like added thereto may be acquired by the distribution source server 10. Incidentally, the video to be viewed is not limited to an example of being acquired by the capturing system 3.

The user terminal device 4 is an information communication terminal device subjected to daily or personal use of a user. As one example, a smartphone 4*a*, tablet terminal 4*b*, or PC 4*c* provided with communication and call functions may be used as the user terminal device 4. Insofar as the user terminal device 4 has an information communication function that can function as a client of the distribution server 2 via the network NT, an appropriate information communication terminal device may be used. The user terminal device 4 may be a mobile terminal or may be a stationary terminal installed in a fixed location. The user terminal device 4 may be connected to the network NT via a proper access point.

Next, a summary of video distribution in the video distribution system 1 will be described with reference to FIG. 2. In the video distribution system 1, the distribution source server 10 acquires a video captured by the capturing system 3 and data of the obtained video are appropriately distributed to the user terminal device 4 as a distribution show. The distribution of the video data may be a live distribution that distributes the video in synchronization with progress of the play or the like of the game at the facility 5 or may be an archive distribution that distributes, at a predetermined time, video data stored in a predetermined database. The distribution method uses simultaneous distribution for simultaneously distributing the video to be viewed to the user terminal devices 4 of the user group. For example, streaming distribution that sequentially distributes video data in parallel with viewing of the video may be adopted as the distribution method.

Video data distributed from the distribution source server 10 is acquired by the relay server 20. A plurality of a distribution base 21 is set up in the relay server 20. The distribution base 21 is set up on the relay server 20 as a unit for relaying video data distributed from the distribution source server 10 and distributing the video data to the user terminal device 4, and corresponds to a relay point in so-called mirror distribution. The distribution base 21 is set up with permission from the distribution source server 10. The distribution base 21 may be a logical location set in the relay server 20 and may be uniquely specified by, for example, an address (URL) on the network NT. One distribution base 21 can be shared by at least two users who wish to view a video.

Figure 3:
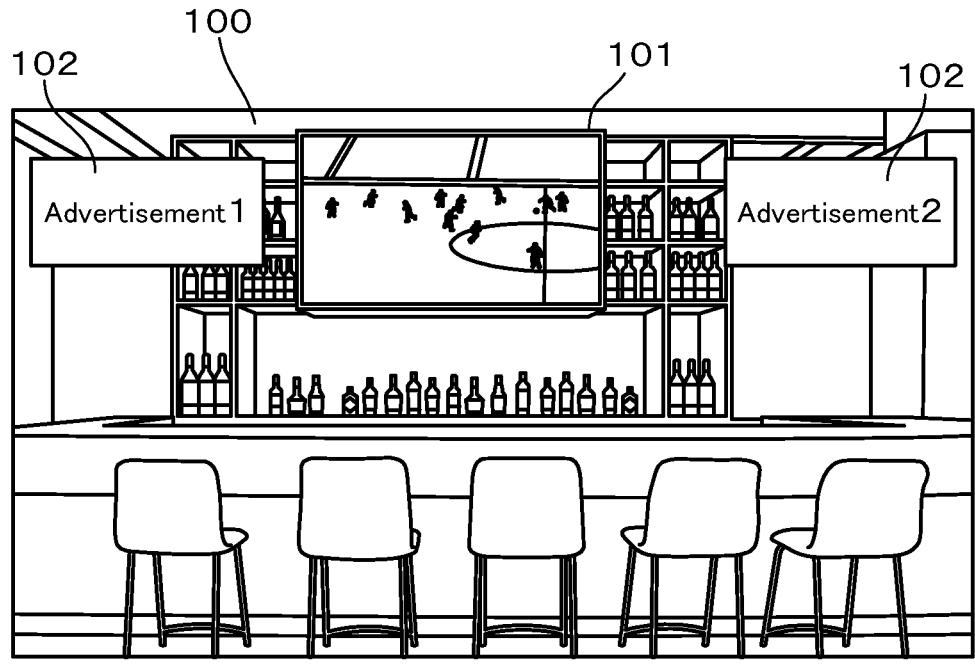
FIG. 3 is a diagram illustrating one example of an image in which a virtual space set up in a distribution base is displayed on a user terminal device.

A virtual room 100 is set up as one example of a virtual space for viewing a video at each distribution base 21. The virtual room 100 is set up so as to virtually reproduce a real space where a plurality of visitors gather to view the video together. For example, as illustrated in FIG. 3, the virtual room 100 representing the interior of a restaurant such as a bar or pub where a plurality of users gather to view a video together via the virtual monitor 101 may be set up in association with the distribution base 21. On user terminal device 4, a moving image expressing a state of viewing a video distributed from the distribution source server 10 via the virtual monitor 101 in the virtual room 100 set up in association with the distribution base 21 is displayed on the user display device 4. As one example, the moving image is generated on the relay server 20 end and distributed to the user terminal device 4, thereby being displayed on the user terminal device 4. Alternatively, the relay server 20 may distribute the video image from the distribution source server 10 to the user terminal device 4, the relay server 20 provide information necessary for displaying the virtual room 100 to the user terminal device 4, and the user terminal device 4 display a moving image in which the video to be viewed and the image of the virtual room 100 are combined. In any case, when likening the distribution base 21 to a concept corresponding to a place where a video is relayed and distributed, the virtual room 100 can be likened to a concept corresponding to viewing facilities or equipment provided in this place. The user uses the distribution base 21 by viewing the video through the virtual room 100. Therefore, use of the distribution base 21 is synonymous with use of the virtual room 100, and sharing the distribution base 21 is synonymous with sharing the virtual room 100.

The virtual room 100 is not limited to the example in FIG. 3 and may be configured to appropriately reproduce a place or space of a commercial facility, public facility, or the like provided so that a specified or unspecified large number of people gather to view a video in the real world. Incidentally, in FIG. 3, an example is illustrated in which a video of soccer is displayed in the virtual monitor 101, but the video viewed via the virtual room 100 may be of various events.

The virtual room 100 may be configured as a three-dimensional virtual space or may be configured as a two-dimensional virtual space. When configuring the virtual room 100 as a three-dimensional virtual space, the configuration may be such that the user is able to freely move in the virtual room 100 and view the video of the virtual monitor 101 from an appropriate position by controlling capturing conditions such as a location, a capturing direction, and a viewing angle of a virtual camera in the virtual room 100 based on an instruction from the user terminal device 4. The virtual space need not necessarily be configured as a space that reproduces an interior. An outdoor event venue, a live venue, or the like may be reproduced as a virtual space.

When a moving image of the virtual room 100 in which a video is added to the virtual monitor 101 is generated on the relay server 20 end, a virtual camera for each user is installed in the virtual room 100, and if imaging conditions are controlled by user's operation, the moving picture of the virtual room 100 based on a viewpoint for each user can be displayed on the user terminal device 4. Conversely, when the moving image of the virtual room 100 in which the video is added the virtual monitor 101 is generated on the user terminal device 4 end, the same video may be distributed from the relay server 20 to each user terminal device 4, and the control of the moving image based on the viewpoint of each user terminal device 4 can be entrusted to the user terminal device 4. In this case, it is possible to reduce the burden on the relay server 20 end, and when adopting a distribution method that sequentially transmits video as in streaming distribution, this is effective in terms of preventing processing delays.

When the virtual room 100 is associated with at least one distribution base 21, the video to be distributed and the specifications of the virtual room 100 are set based on an instruction of a prescribed setter. A plurality of virtual rooms 100 having mutually different specifications may be set based on instructions from the same setter or different setters. The specifications of the virtual room 100 will be described later. The setter may be an individual or a corporation. The setter may be a person who can be a user as a viewer of a video or a person distinguished from a user who can be a viewer. The setter may be limited to, for example, a person to whom creation permissions are given by the relay server 20 or the distribution source server 10. In this case, for example, user authentication is performed for access to the relay server 20 from the user terminal device 4, presence or absence of creation permissions is determined based on information of the user obtained by the authentication, and only users having creation permissions can create the virtual room 100 as the setter. The terminal device operated by the setter in the virtual room 100 may be an information communication terminal device that functions as the user terminal device 4 for viewing a video or may be a different information communication terminal device for setup.

When a plurality of videos distributable by the distribution source server 10 are prepared as distribution candidates, any of the videos is selected from the distribution candidates based on an instruction of the setter, and the selected video may be set as a video to be viewed or distributed by being relayed and distributed from the virtual room 100 to the user terminal device 4. The distribution date and time may be defined in advance for the distribution candidate videos. For example, in the case of live distribution, the distribution date and time of the video may be defined in accordance with the execution date and time of the event or the like that serves as the basis for the live distribution. In this case, the date and time of the event are set as the date and time of viewing the video in the virtual room 100. Even in the case of archive distribution, the distribution date and time may be set for the virtual room 100.

The specifications of the virtual room 100 are a concept meaning the contents of the virtual room 100 defined by a collection of items characterizing the virtual room 100. At least part of the specifications of the distribution base 21 are set by the setter setting at least part of the items characterizing the virtual room 100. That is, the specifications of the distribution base 21 are defined via the specifications of the virtual room 100.

The specifications of the virtual room 100 are defined by various requirements. For example, users who can use the virtual room 100 (sometimes called members), an internal configuration of the virtual room 100, advertisements displayed in the virtual room 100, and events applied to the users using the virtual room 100 are prepared as requirements for defining the specifications of the virtual room 100. At least some of the requirements are set based on an instruction of the setter. At least some of the requirements set based on the instruction of the setter are set so as to narrow the range of the user group sharing the virtual room 100 to a range intended or assumed by the setter and to limit users of a user group sharing the virtual room 100, that is, users using the virtual room 100, to users meeting a certain requirement.

Requirements of the member of the virtual room 100 are set as human requirement for restricting users using the virtual room 100 to within a range of a user group intended or assumed by the setter. The requirements of the members may be set up in a form designating the users in advance or in a form designating the attributes of the user such as age group, interests, etc., of the users. When the video to be viewed is a video relating to a game such as a sport, supporting players, teams, or the like may be included in the requirements of the members as at least a part of the attributes of the users. The requirements of the members may include a number of people requirement for limiting to a prescribed number of people range. For example, the number range may be set as the human requirement by designating at least one of an upper limit value and a lower limit value of the number of people using the virtual room 100. When viewing permissions are set with respect to the viewing of the video, a requirement of the members may be set so that the virtual room 100 can be used only by user having the viewing permissions with respect to the video set to be viewed. The viewing permissions may be set, for example, when a price is required to view the video.

The requirements of the members may include geographical requirements for restricting the users using the virtual room 100 to users located within a predetermined geographical range. The geographical range may be set, for example, based on administrative districts or based on a distance from a specific reference point. The reference point may be set as, for example, a shooting location for a video, or may be set as a reference point for a specific facility such as a specific commercial facility or public facility. The location of the user can be specified based on, for example, location information acquired from a GPS function of the user terminal device 4. Alternatively, the location of the user may be specified by using an access point used for connecting the user terminal device 4 to the network NT or network information acquired from a router or the like.

The requirements of the internal configuration of the virtual room 100 are requirements for designating a viewing environment of the virtual room 100. The internal configuration means the viewing environment of a virtual room 100 recognizable by the user via the user terminal device 4. The internal configuration of the virtual room 100 may be set up, for example, by preparing a plurality of models having different internal configurations beforehand, having the user select one of the models, and the user appropriately customizing the selected model. As examples of customizable items, various items may be prepared that decide a type of the virtual monitor 101, equipment or furnishings such as interior finishings, furniture, appliances, and lighting fixtures in the virtual room 100, arrangement of the equipment, the furnishings, and the virtual monitor 101, and a viewing environment such as background music played in the virtual room 100. These customizations may also be realized by a method where a user selects parts or the like prepared in advance and designates locations thereof.

The internal configuration of the virtual room 100 may act as a requirement for narrowing down users using the virtual room 100. That is, the intent of the setter is reflected in the internal configuration of the virtual room 100. On the other hand, the user might select the virtual room 100 in consideration of whether the virtual room 100 is an internal configuration matching their own interests and preferences. Thus, it is expected that a user group having interests, preferences, personalities, or attributes appropriate for the intention of the setter will gather in the virtual room 100 having an internal configuration reflecting the instructions of the setter. Accordingly, the internal configuration of the virtual room 100 functions as a requirement for narrowing down the range of the user group using the virtual room 100 to a certain extent, though the users using the virtual room 100 are not limited.

The requirements of advertisements of the virtual room 100 are requirements set for managing advertisements to be displayed on the user terminal device 4 in association with the virtual room 100. An advertisement is displayed on the user terminal device 4 in order to promote a product or a service to a user using the virtual room 100. For example, as illustrated in FIG. 3, a moving image that illustrates the state of the virtual room 100 is displayed on the user terminal device 4, but an appropriate advertisement 102 is displayed together with the moving image. The advertisement 102 may be displayed as an in-line advertisement embedded in the virtual room 100 or as an overlay advertisement superimposed on the virtual room 100. The advertisement 102 may be displayed outside the virtual room 100. The advertisement 102 may be displayed in a window different from a window for displaying the virtual room 100. The display mode of the advertisement 102 may be changed according to the configuration of the user terminal device 4. In any case, the advertisement 102 may be displayed in an appropriate mode insofar as visually recognizable by the user using the virtual room 100.

Returning to FIG. 2, at least some the advertisements are displayed to present a paid service available to the user via the virtual room 100 or to provide the user with an opportunity to use a paid service. For example, the user is guided to a predetermined paid service for which the user's reaction to at least some of the advertisements is a trigger. In addition, a discount that reduces a fee may be further applied to the paid service as an example of a benefit for use thereof, and discount conditions as an example of application conditions may be set in relation to the discount. The mechanism thereof will be described in detail later.

The requirements for the advertisements of the virtual room 100 may include, for example, requirements relating to the selection and display relating to the advertisements. The requirements relating to the selection of the advertisements may be set in such a manner that the setter directly designates the advertisements to be displayed in the virtual room 100 or may be set in such a manner that the setter designates the trends of the advertisements to be displayed in the virtual room 100.

The requirements relating to the selection of the advertisements may be set such that the relay server 20 automatically selects and displays the advertisements fit for the virtual room 100. The requirements relating to the selection of advertisements may be set in association with the range of the user group of the virtual room 100 assumed through the specifications of the virtual room 100. For example, the requirements of advertisement selection may be set by a method in which: a user of the setter designates an advertisement appropriate for the range of the user group that the setter intends through the requirements of members set as the specifications of the virtual room 100, the internal configuration of the virtual room 100, or the like; and the range of the user group that the setter intends is designated as a condition for advertisement selection. Thus, by defining the requirements for advertisement selection, an advertisement suitable for the range of the user group intended or assumed by the user of the setter is displayed in association with the virtual room 100, whereby the effect of the advertisement can be enhanced. By displaying an advertisement associated with a paid service suitable for the user group assumed by the user of the setter, a paid service suitable for the range of the user group can be provided to the user through the virtual room 100. Thus, an opportunity for selling products or the like can be created by using the virtual room 100.

The requirements relating to the display of advertisements are requirements for designating how the advertisements should be displayed. For example, items such as a location where the advertisement should be displayed, a time for displaying the advertisement, and the number of advertisements to be displayed may be set as requirements relating to the display of the advertisements. The time for displaying the advertisement may be defined by a start time and an end time of the display or by a length of the display time.

At least some of the requirements relating to the advertisements of the virtual room 100 act as requirements for narrowing down the range of the user group sharing the virtual room 100. That is, at least some of the advertisements are displayed to provide the users using the virtual room 100 with an opportunity to use a paid service associated with the advertisement. Therefore, by designating the selection and display of the advertisement associated with the paid service by the setter, the setter can set what kind of paid service is provided to the user and how it is provided through the virtual room 100. Conversely, the user may select the virtual room 100 in consideration of what kind of paid service is provided in what manner in the virtual room 100. Therefore, the setting of the advertisement may act as a requirement for narrowing the range of the user group sharing the virtual room 100.

Requirements relating to an event of the virtual room 100 are requirements for designating an event for a user using the virtual room 100. For example, a cheering event or the like for the video displayed on the virtual monitor 101 may be prepared. The cheering event, for example, when the video to be viewed is a video of a game such as a sport, requests a predetermined cheering operation from the user group sharing the virtual room 100 and converts the cheering operation into points according to a fixed standard to compete for the level of points. In the cheering event, a competitive aspect such as an in-room ranking in which the users of the virtual room 100 compete for the level of obtained points, or an inter-room ranking in which virtual rooms 100 compete with each other the total values of the points obtained by the users of the virtual room 100 may be further added. The event acts as one pastime which can be obtained by using the virtual room 100, and may be a consideration factor when the user selects the virtual room 100. Thus, a requirement relating to the event may also act as one requirement for narrowing down the range of the user group using the virtual room 100.

In the virtual room 100, in addition to viewing videos, providing paid services, and providing events, a community function for communicating between users may be made available. For example, the configuration may be such that a community of users can be formed through a function such as chatting between users and posting comments. The chat may include a voice chat using voice communication. An avatar acting as a stand-in for the user may be moved in the virtual room 100, and a community between the users may be formed through the avatars. The community function may be an optional function for which the possibility of use can be switched according to an instruction of the setter or may be a basic function that is always provided to the virtual room 100. When the user of the setter can select the use of the community function, whether use is possible may be considered in the selection of the virtual room 100 by the user, and setting the possibility thereof may also act as a requirement for narrowing the range of the user group sharing the virtual room 100.

Figure 4:
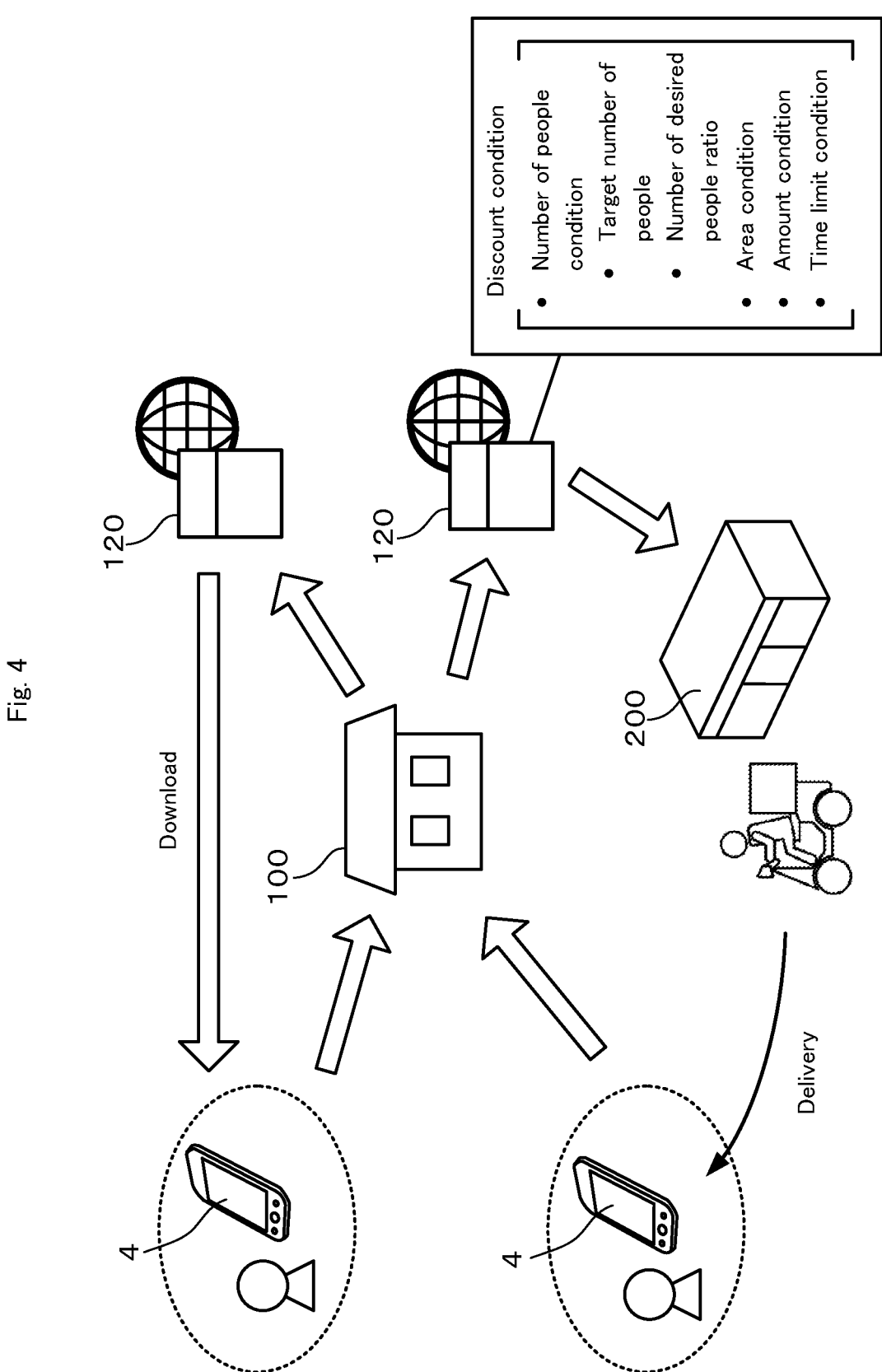
FIG. 4 is a diagram illustrating one example of a mechanism for providing a paid service to a user via a virtual space.

Next, one example of a mechanism for providing a paid service will be described with reference to FIG. 4. In the example of FIG. 4, when a user using the virtual room 100 designates an advertisement and requests the use of a paid service associated with the advertisement, the paid service is provided to the user via a website 120. For example, when the user selects the advertisement 102 in FIG. 3 and performs a predetermined operation (for example, an operation to click on the advertisement 102), the user is directed to the paid service associated with the advertisement 102, with the operation being a trigger. Two websites 120 are illustrated in FIG. 4, but the number of websites 120 that provide a paid service to the user may be appropriate. The content of the website 120 may be displayed so as to be incorporated in part of the virtual room 100, displayed outside the virtual room 100, or displayed in a window separate from a window displaying the virtual room 100. In any case, the website 120 may be displayed by a suitable method used in web browsing.

The website 120 may be provided so as to provide various paid services, such as a site that downloads electronic data and programs purchased by the user, such as game data and programs, or various information to the user terminal device 4, a site that sells products such as food and beverages and provides delivery or catering services that deliver products purchased by the user from an actual store 200 to a location designated by the user, or an e-commerce site that sells various products or services for a fee. The delivery or the catering service is an example of a product sales service that allows a user to purchase products and delivers the products to the user. The product sales service is not limited to selling products such as food and drink, but may also be a service that delivers various products purchased on an e-commerce site. The product or service sold by the paid service may be a product or service associated with the video to be viewed. For example, in the case of a video of an event of a game, a card or other commemorative goods or data related to the event may be sold. Alternatively, in the case of a video of a sports event, cheering goods or the like may be sold. When an event targeting a user group sharing the virtual room 100 is set up, a product or service associated with the event may be sold. For example, data or the like for promoting an event may be sold.

An operator providing the paid service via the website 120 may coincide with the setter of the virtual room 100 or may be different. For example, an operator providing a paid service may create the virtual room 100 and post an advertisement in order to attract users of its own service. Alternatively, business may be conducted in which the setter creates the virtual room 100 in cooperation with a operator that provides the paid service and a user of the setter of the virtual room 100 receives a portion of sales obtained by the operator by due to use of the paid service via the virtual room 100.

A benefit for use is prepared for the paid service provided by at least a portion of the website 120. For example, a discount of a service charge is prepared as a benefit. Discount conditions may be set as one example of the application conditions of the benefit. The discount condition may be independently set for each virtual room 100. FIG. 4 illustrates an example in which a discount condition is set in association with a delivery service, but the same discount condition may be set regardless of the type of paid service and the discount condition may be set independently for each paid service for one virtual room 100.

The discount conditions are set in association with a request for use of a paid service from the user group sharing the distribution base 21. As an example of a unit of a user group using one virtual room 100, the discount conditions may include a number of people condition that is met when the number of users (hereinafter referred to as applicants) requesting use of the service within is within a predetermined target number of people range. The number of people condition may be set such that, for example, the number of desired people in the user group using the same virtual room 100 is equal to or greater than a minimum number (lower limit value). Alternatively, a maximum number (upper limit value) of the number of users to which the discount condition is applied may be set as the number of people condition. The number of people condition may be set so as to be met when the ratio of the number of desired people to the total number of users (total number of viewers) of the user group using the same virtual room 100 is a predetermined value or greater. The number of people condition may be set in tiers. For example, a plurality of threshold values may be set with regard to the number of applicants for a paid service, and a tiered condition may be set such that the discount amount of the fee increases in tiers for each threshold value.

The discount conditions may include an area condition that is met when the location of the user is within a predetermined target area. For example, area conditions may be set so as to be met only when a user in an area where delivery from a specific actual store 200 is possible requests the use of a paid service; in other words, only users in the area is subject to the discount. The target area need not be limited to the delivery area of a single actual store 200. For example, an area in which delivery is possible by each of a plurality of chain actual stores 200 may be set as the target area. The location of the user may be specified based on location information acquired from the user terminal device 4 or based on network information such as an access point, in the same manner as a geographical requirements acting as a portion of the specifications of the virtual room 100.

The discount conditions may include an amount condition associated with a service usage fee in one virtual room 100. For example, the amount condition may be set such that a discount is applied when the total amount of the usage fees of the services within the same virtual room 100 is a predetermined value or more. In place of or in addition to the amount condition, a discount condition may be set for a quantity of products ordered by the user. In any case, the number of people condition, amount condition, and the like may be set as conditions of a so-called volume discount associated with a scale of orders relating to products and the like.

The discount condition may include a time limit condition limiting the application time thereof. For example, a discount time limit may be set in association with a video distribution time. In this case, a time limit may be set in association with a start time of the distribution, a time limit may be set in association with an end time of the distribution, and a time limit may be set in association with both the start time and the end time. When associated with the start time of the distribution, it is possible to set the discount condition to be applied from an early time or a late time of a predetermined time relative to the start time. When associated with the end time of the distribution, it is possible to set the discount to not be applied when an early time or a late time of a predetermined time relative to the end time has passed. Alternatively, it is possible to set the discount to end application once a ratio of the distribution time length, for example 80% of the distribution time length, has passed. Incidentally, when the video is distributed live, the delivery end time may be indefinite depending on the event to be captured. In such a case, the time limit may be dynamically changed according to the actual situation of the distribution.

The number of people condition, area condition, amount condition, and time limit may be set as so-called and conditions by appropriately combining them. For example, the number of people condition and the area condition may be combined such that they are not met unless the number of applicants meeting the area condition meets the number of people condition. In this case, it is possible to set a discount condition that meets the circumstances of the operator that provides the paid service, for example, when receiving an order for a product from a predetermined number of users or more located in a delivery area from a specific actual store 200. In addition to this, the discount conditions may be appropriately modified according to the content of the paid service, the circumstances of the operator, and the like.

The discount condition may be set in association with the range of the user group sharing the virtual room 100. For example, the discount condition may be set to conform the range of the user group assumed through the specifications of the virtual room 100. As one example, when the number of people requirement limiting the range of the number of users using the virtual room 100 is set, a target number of people range that meets the number of people condition of a discount condition may be set within the range of the number of users. When a lower limit value or upper limit value of the target number of people range is set within the range of a minimum number of people or maximum number of people for the number of people requirement set as a specification of the virtual room 100, it is possible to set the number of people to whom the discount is applied without excess or deficiency and optimize the possibility that the discount is applied.

When a geographical requirement is set as a specification of the virtual room 100, a target area meeting the area condition of the discount condition may be set within the geographical range of the users defined by the geographical requirement. Thus, it is possible to match the geographical requirement with the area condition of the discount condition as specifications of the virtual room 100 to set the target area to which the discount is applied without conflict and optimize the possibility that the discount is applied. In addition, as relating to the specifications of the virtual room 100, by matching and combining the discount condition with requirements for narrowing down the range of the user group or requirements for limiting the users, it is possible to optimize the possibility that the discount is applied.

The discount condition need not necessarily be set in association with the range of the user group assumed through the specifications of the virtual room 100. For example, when the virtual room 100 is already available at a stage before the start of the distribution of the video or when viewing of the video via the virtual room 100 can be reserved in advance, the range of the user group may be determined or estimated based on the usage status or the reservation status, and a target number of people range as relating to the number of people condition of the discount condition may be dynamically adjusted according to the determination result or the estimation result. Alternatively, even after the start of distribution, the target number of people range of the number of people condition may be dynamically adjusted according to the actual usage state of the virtual room 100. The target area of the area condition in the discount conditions may also be dynamically adjusted according to the usage status or reservation status of the virtual room 100.

Incidentally, when a time limit condition is set with regard to the discount conditions, it is preferable that the requirement for the advertisement display time set as a specification of the virtual room 100 be set so as to be consistent with the time limit condition such that the advertisement is continuously displayed during the time when the discount can be applied.

Figure 5:
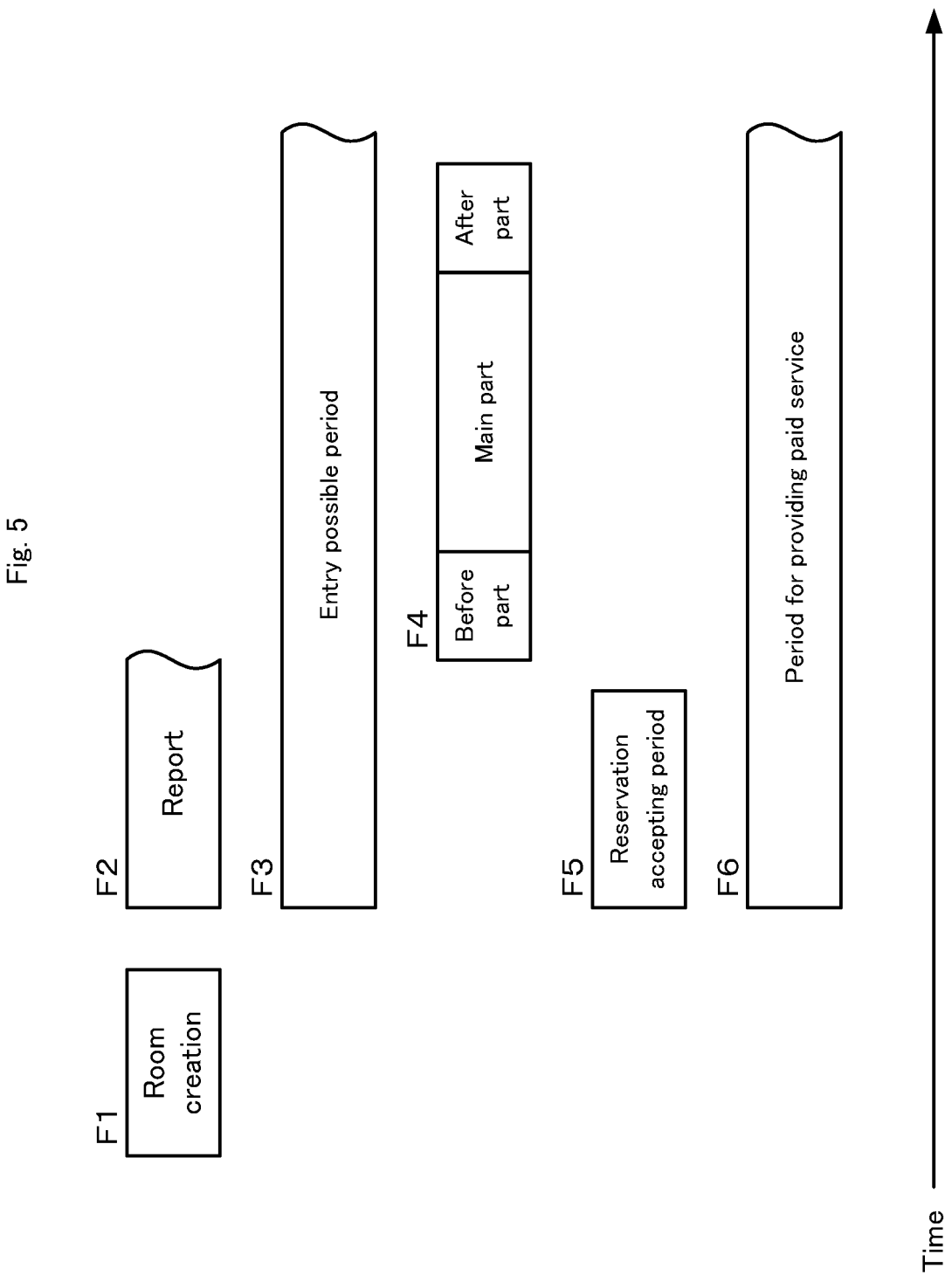
FIG. 5 is a diagram chronologically illustrating one example of a main process when distributing video via a virtual space.

FIG. 5 chronologically illustrates one example of the main steps that occur in relation to the setup and use of the virtual room 100. First, the virtual room 100 is created based on an instruction of a setter (F1), and when the creation is completed, the virtual room 100 is reported to a user who may be a viewer (F2). The report is performed to inform the user of the virtual room 100 and to prompt the user to use such and may include information for specifying a video distributed in the virtual room 100 and a distribution time thereof and specifying specifications of the virtual room 100. When the paid service is provided via the virtual room 100, information for specifying the paid service may be also reported to the user as a portion of the specifications of the virtual room 100. The report of the virtual room 100 may be a push notification to the user terminal device 4 or a pull notification published on a suitable website provided by the relay server 20.

Once the virtual room 100 is created, the user can select the created virtual room 100 and display the inside thereof on the user terminal device 4 (F3). When a requirement limiting available users is set as relating to the specifications of the virtual room 100, only users meeting the requirement can display the inside of the virtual room 100 on the user terminal device 4. Hereinafter, the act of selecting the virtual room 100 and viewing the inside thereof is referred to as "entry." Furthermore, a period in which entry into the virtual room 100 is possible is called an entry possible period. The start time of the entry possible period may be set as an appropriate time after creation of the virtual room 100 and before the start of distribution of the video. The setter of the virtual room 100 may set the start time of the entry possible period. The start time of the report relating to the virtual room 100 may coincide with or may be different from the start time of the entry possible period of the virtual room 100. When the start time of the entry possible period is set later than the report start time, the report contents may include the start time of the entry possible period.

At a predetermined time within the entry possible period, the video is distributed and the video can be viewed via the virtual monitor 101 (F4). The video may include a before part and an after part as appropriate in addition to, for example, a video of an event or the like which is the captured target of the capturing system 3, that is, a main part composed of a video that is the primary viewing purpose. For example, a video of various types of announcements, advertisements, and the like may be added as the before part, or a video that shows commentary, replays, future distribution schedules, and the like to the main part may be added as the after part. The advertisements in this case may conform to the requirements of the advertisements designated by the setter of the virtual room 100 as the requirements of the specifications of the virtual room 100 or may be advertisements added to the main part in advance on the distribution source server 10 end. When adding the before part, the video distribution start time may be set so that the before part is started at or after the start of the entry possible period. In this case, an opportunity can be provided for a user group that has entered the virtual room 100 in the time period before starting the main part to make form friendships through community functions, various events, and the like. It is also possible to increase the user's expectations for the main part via the before part. When the first part includes an advertisement, the effect of the advertisement can also be increased. Incidentally, when there is no before part, the start time of distribution of the main part may be set at or after the start time of the entry possible period.

Furthermore, once the virtual room 100 is created, a reservation accepting period for viewing the video distributed in the virtual room 100 is then set (F5). This allows the user to reserve viewing of the video before entering the virtual room 100 and may guide the user to a reservation operation in association with the report of the virtual room 100. A reminder may be notified to the reserved user at a predetermined time before the start of video distribution. The start time of the reservation accepting period may be set at an appropriate time insofar as it is after the creation of the virtual room 100. The reservation accepting period may be started at an early time of a predetermined time length relative to the video distribution start time. Conversely, the end time of the reservation accepting period is at the least set to before the start of the main part of the video. When the video includes the before part, the end time of the reservation accepting period may be set to a time earlier than the start time of the before part. The end time of the reservation accepting period may be set to a time after the start time of the before part and before the start time of the main part.

A period for providing a paid service is set at an appropriate time within the entry possible period of the virtual room 100 (F6). For example, the start time of the period of provision of the paid service may be the same time as the start time of the entry possible period or a suitable time after such. The start time of the period of provision of the paid service may also be an appropriate time. The period for providing the paid service need not necessarily be set in conjunction with the distribution time of the video, but when providing, for example, a food and drink delivery service, the start time of providing the delivery service may be set so that delivery is in time for the distribution time of the video. When providing an opportunity to use the paid service via an advertisement displayed in the virtual room 100, the display period as an advertisement requirement defined as a portion of the specification of the virtual room 100 may be designated as the provision period of the paid service. When a plurality of paid services is provided in association with the virtual room 100, a provision period may be set for each paid service.

The end time of the entry possible period can be set appropriately in association with the distribution time of the video. For example, after the distribution of the video has ended, the time at which a predetermined time length has passed may be set as the end time of the entry possible period. When a plurality of videos of different distribution times is distributed at appropriate time intervals in one virtual room 100, the start time and end time of the entry possible period may be appropriately defined for each video, or the configuration may be such that the user may enter the room at any time without particularly defining the end time of the room entry period. The end times of both the report period of the virtual room 100 and the provision period of the paid service can also be set as appropriate according to the end time of the entry possible period, and when the end time of the room entry possible period is not defined, the report is continued without particularly defining end times for both the report period of the virtual room 100 and the provision period of the paid service, or the user using the virtual room 100 can receive the paid service at any time.

When the start time of the entry possible period of the virtual room 100 is set prior to the distribution time of the video or when the reservation accepting period is set for viewing of the video, the range of the user group using the virtual room 100 can be distinguished at the stage before the video is distributed. When the before part is added to the video, it is possible to estimate the range of the user group viewing the main part at the stage of the before part. In such a case, it is possible to adjust the target number of people range that meets the number of people condition for the discount conditions based the predicted value of the number of viewers, thereby optimizing the possibility that the discount will be applied. Such management may be implemented in conjunction with setting up the number of people requirement of members that is set as a portion of the specifications of the virtual room 100, but it may also be implemented when no requirement relating to the number of members is set, that is, when there is no restriction on the number of users who can use the virtual room 100.

As above, in the video distribution system 1, the specifications of the virtual room 100 corresponding to at least one distribution base 21 can be set based on an instruction of a user of the setter. Therefore, the intent of the setter can be reflected through the specifications of the virtual room 100 as relating to the environment in which the video to be viewed is allowed to be viewed. Accordingly, the range of the user group sharing the virtual room 100 is narrowed down or restricted to the range intended by the setter, the user group in the range intended by the setter is gathered in the same virtual room 100, and the virtual room 100 can be made to function as a place where the user group views a video together. By appropriately narrowing down the interests, preferences, attributes, and the like of viewers gathering in the virtual room 100, the user group using the virtual room 100 is assumed, and an advertisement matching such can be displayed to increase the effect of the advertisement. By providing a paid service matching the user group using the virtual room 100, a commercial opportunity relating to the paid service can be created.

In the example described above, the advertisement is used as a lead to direct the user to the paid service, but an opportunity to use the paid service need not necessarily be provided via the advertisement. For example, the paid service may be provided by a method of presenting to the user a list, menu, or the like that includes paid service candidates in a moving image of the virtual room 100 or separately from the virtual room 100 and directing the user to the website 120 of a paid service due to the user selecting the paid service from among these and requesting use thereof. The advertisement displayed in association with the virtual room 100 is not limited to providing an opportunity to use the paid service. A suitable advertisement for advertising a predetermined product or service may be displayed in association with the virtual room 100, and the type of advertisement may also be selected and displayed as appropriate based on the requirements of the advertisement acting as specifications of the virtual room 100.

In the example describe above, a reduction (discount) of the fee necessary to use the service is set as an example of a benefit relating to the use of a paid service, but the benefit is not limited thereto, and appropriate modifications are possible. For example, various benefits may be prepared, such as granting exchange value for coupons, points, and the like that can be used inside the video distribution system 1 or outside the video distribution system 1, granting electronic data such as wallpaper that can be used on the user terminal device 4, sending sales promotion goods, and the like. Alternatively, benefits may be prepared in association with the use of the virtual room 100. For example, benefits such as changing the internal configuration of the virtual room 100 to a special configuration, permitting entrance to a VIP room prepared in the virtual room 100, or granting treatment as a senior member in the virtual room 100 may be prepared. The application conditions of the benefit can also be appropriately changed according to the content and the like of the benefit.

The relay server 20 acquires the video from the distribution source server 10 and relays and distributes the acquired video from the distribution base 21 set in the relay server 20 to the user terminal device 4, and thus the distribution source server 10 need not manage distribution of the video at every distribution base 21. The distribution source server 10 need not individually manage the setting of the virtual room 100 associated with the distribution base 21 and various functions realized through the virtual room 100. Therefore, the load on the distribution source server 10 can be reduced. Conversely, by individually managing the virtual room 100 with the relay server 20, it is possible to individually provide an environment suitable for a comparatively small-scale user group to view a video together. Furthermore, the distribution base 21 of the relay server 20 is provided based on permission from the distribution source server 10, and thus the possibility of unauthorized viewing of videos can be eliminated within a range that the distribution server 2 cannot grasp.

Next, a more specific example for implementing the various functions described above of the video distribution system 1 will be described with reference to FIG. 6. Incidentally, the following example is one example for when an advertisement is displayed in the virtual room 100 based on the specifications set for the virtual room 100 and an opportunity to use a paid service is provided to the user via at least a portion of the advertisement.

Figure 6:
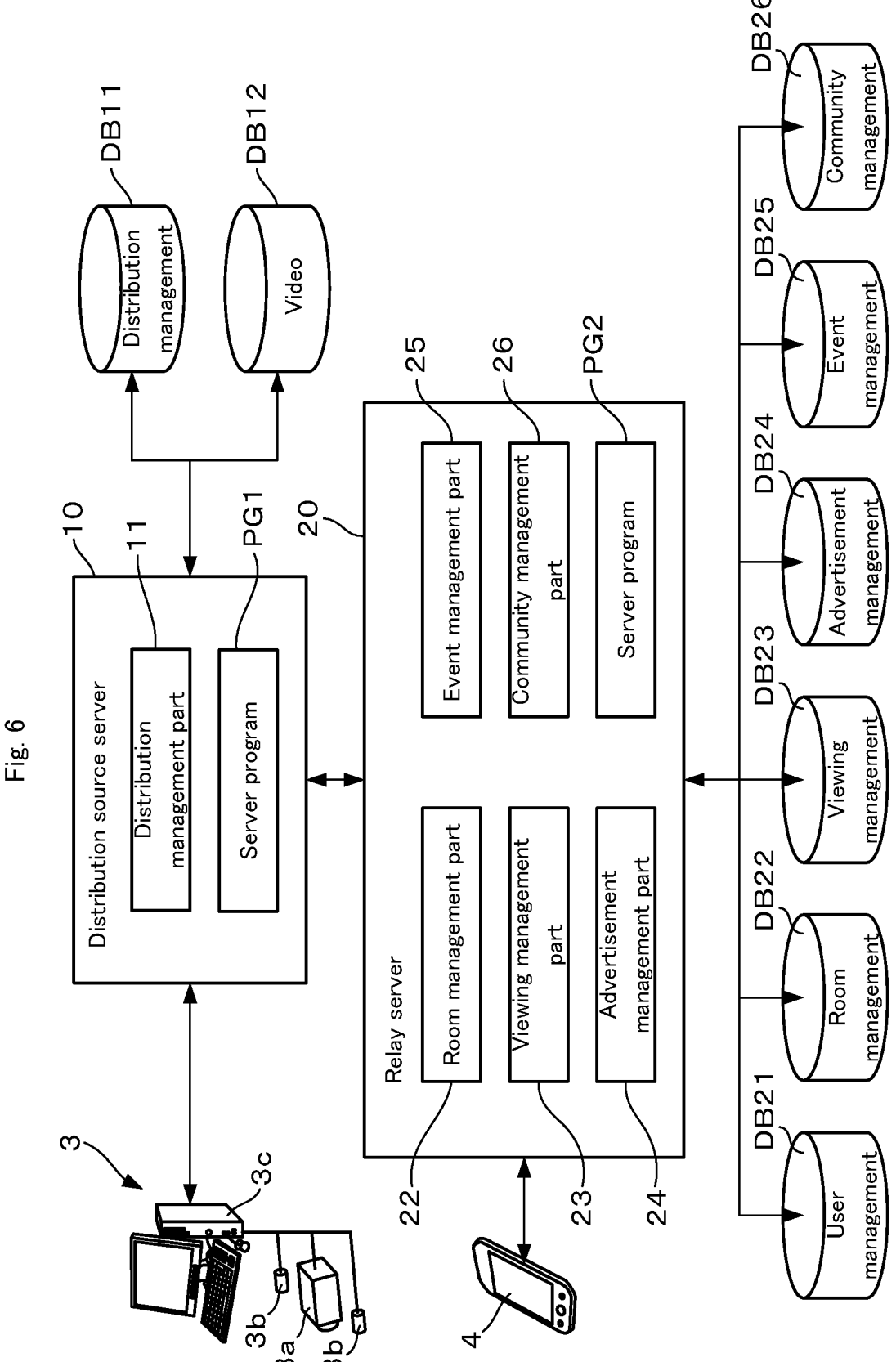
FIG. 6 is a diagram illustrating one example of a configuration of a control system of a distribution server provided in a video distribution system.

As illustrated in FIG. 6, the distribution source server 10 is provided with a distribution management part 11 as a logical device realized by a combination of hardware of a server unit acting as a computer and a server program PG1 acting as software. A distribution management database DB11 for holding various data required to manage a distribution destination of the video or a distribution schedule and a video database DB12 for holding video data to be distributed are connected to the distribution source server 10. A distribution management part 11 distributes the video data acquired from the capturing system 3 according to information recorded in the distribution management database DB11 or stores the video data acquired from the capturing system 3 in the video database DB12 as necessary.

The relay server 20 is provided with a room management part 22, a viewing management part 23, an advertisement management part 24, an event management part 25 and a community management part 26 as logical devices realized by a combination of hardware of a server unit acting as a computer and a server program PG2 acting as software. The room management part 22 handles processing relating to setup of the virtual room 100. The viewing management part 23 handles processing relating to distribution of video data via the distribution base 21. The advertisement management part 24 handles display of advertisements associated with the virtual room 100 and processing associated with provision of a paid service corresponding to the advertisement. The event management part 25 handles processing relating to various events prepared for the user of the virtual room 100. The community management part 26 handles processing relating to community formation through chatting and the like between users for each virtual room 100.

A user management database DB21, a room management database DB22, a viewing management database DB23, an advertisement management database DB24, an event management database DB25, and a community management database DB26 are connected to the relay server 20 as databases for acquiring or storing information required for the processing of each of the parts 22 to 25. The user management database DB21 is a database in which various information about users is recorded in association with unique identification information for each user, for example, a user ID. For example, the user's name (real name or pseudonym), the user's age group, location, and attributes such as interests, or information such as the user's viewing history are stored in the user management database DB21. This type of database is implemented in various systems that manage various information relating to the user by an identification number of the user, and the user management database DB21 may be configured similarly to this type of system.

The room management database DB22 is a database for storing information on the virtual room 100 created by the room management part 22. The specifications of the virtual room 100 set based on the instructions of the setter are also stored in the room management database DB22. The viewing management database DB23 is a database for storing information required for managing the distribution of the video at each distribution base 21. The advertisement management database DB24 is a database for causing the advertisement management part 24 to display an advertisement associated with the virtual room 100 on the user terminal device 4 or storing information required for guiding a user to a paid service corresponding to the advertisement. The event management database DB25 is as database for storing information required for the event management part 25 to manage the execution and the results of the event. The event management database DB25 may include event data describing the contents of events that can be implemented in the virtual room 100, event execution conditions, processing methods of results, and the like for each event, and details thereof are omitted. The community management database DB26 is a database for storing information required for the community management part 26 to manage the community of each virtual room 100. For example, data of material for realizing a community function, data of a log such as comments posted by users, and the like are recorded in the community management database DB26. The community management database DB26 may be configured similarly to an existing system providing a community function via chat or the like, and details thereof are omitted.

Incidentally, the configuration of the control system of the user terminal device 4 is omitted in FIG. 6, but the user terminal device 4 may provide various functions provided by the relay server 20 to the user by using a dedicated application program prepared for the video distribution system 1 or a web browser implemented in the user terminal device 4.

Figure 7:
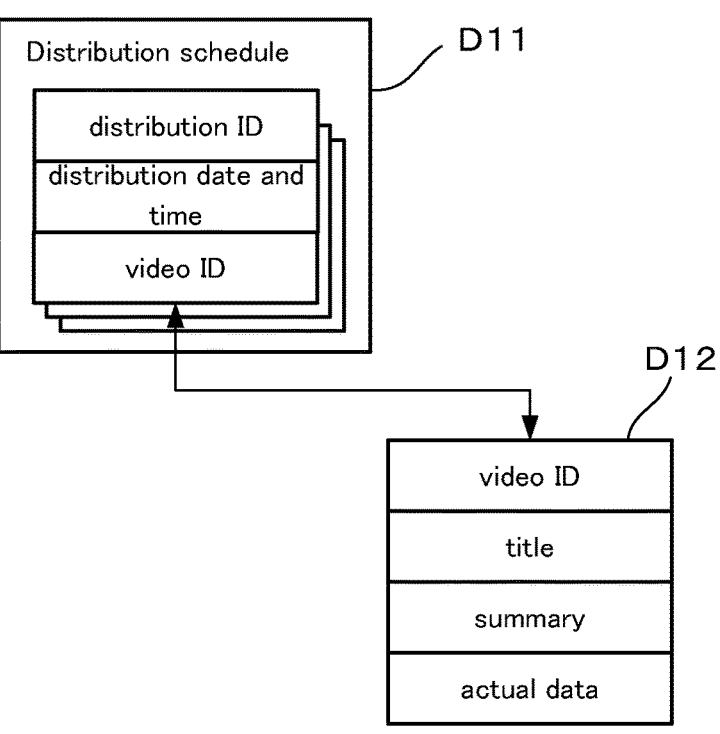
FIG. 7 is a diagram illustrating one example of a configuration of distribution schedule data and video data.

Next, specific examples of data stored in some of databases will be described with reference to FIGS. 7 to 11. FIG. 7 illustrates an example of data saved in the distribution management database DB11 and the video database DB12. Distribution schedule data D11 is stored in the distribution management database DB11 as one example of data for managing distribution to the relay server 20. The distribution schedule data D11 is a collection of records in which a distribution date and time and a unique video ID for each video to be distributed are recorded in association with a unique distribution ID for each distribution and functions similarly to data for generating a show table in, for example, a television broadcast. The records included in the distribution schedule data D11 are sorted by the distribution date and time, whereby the distribution schedule can be shown similarly to a show table. Setting the distribution ID separately from the video ID is to distinguish between distributions when the same video is distributed with a different distribution date and time. Incidentally, a plurality of channels may be set up in the distribution source server 10, and the distribution schedule data D11 may be provided for each channel. Data indicating a distribution destination is also recorded in the delivery management database DB11, but illustration thereof is omitted. The data of the distribution destination may be configured to list, for example, the address of the relay server 20 of the distribution destination or the address of the distribution base 21 generated in the relay server 20 in an appropriate format. When the distribution base 21 is managed by the relay server 20, only the address of the relay server 20 of the distribution destination may be described in the distribution management database DB11.

Conversely, video data D12 is recorded in the video database DB12. The video data D12 is data distributed to the relay server 20 and has a structure in which a title and a summary of the video and actual data for reproducing the video itself acquired from the capturing system 3 are recorded in association with a unique video ID for each video. The summary of the video may include various information that may serve as reference for video selection, such as information for distinguishing videos in the form of a genre or category of video, and information indicating a summary of the video. Due to the video ID being listed in the video data D12, the record recorded in the distribution schedule data D11 and the video data D12 are associated. Incidentally, the video ID, title, and summary may be added in advance on the capturing system 3 end or may be added on the distribution source server 10 end. In the case of live distribution, information other than the actual data may be recorded in the video data D12 in advance, and the live video data sent from the capturing system 3 may be incorporated into the video data D12 and distributed. In the case of archive distribution, actual data may be recorded beforehand in the video data D12.

Figure 8:
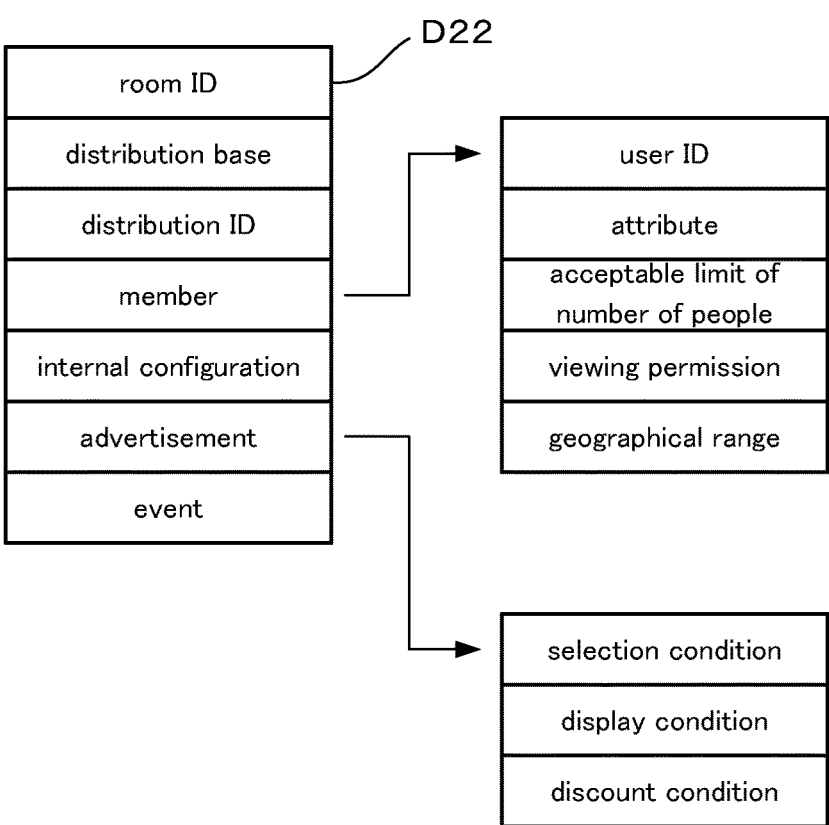
FIG. 8 is a diagram illustrating one example of a configuration of room data.

FIG. 8 illustrates an example of room data D22 stored in the room management database DB22. The room data D22 created for each virtual room 100 is stored in the room management database DB22. FIG. 6 illustrates the room data D22 corresponding to one virtual room 100. Information for specifying various setting items relating to the virtual room 100 illustrated in FIG. 2 is recorded in the room data D22 in association with a unique room ID for each virtual room 100. For example, information of the distribution base 21 to which the virtual room 100 should be associated and the distribution ID relating to the video to be distributed are recorded in the room data D22. Furthermore, information corresponding to the setting contents of requirements for defining the specifications of the virtual room 100, and requirements for members, internal configurations, advertisements, and events in the example in FIG. 2, is further recorded in the room data D22.

The information relating to the members is information indicating the member requirements of the virtual room 100, and for example, information that designates the members who can use the virtual room 100 by the user IDs thereof, information that designates the attributes of the members who can use the virtual room 100, information that designates the range of the number of people who can use the virtual room 100, information for determining whether viewing permissions of the video are necessary, information that designates the geographical range of the users who can use the virtual room 100, and the like may be recorded in the room data D22 as information relating to the members. All of the information of the members illustrated in FIG. 8 need not necessarily be designated by the room data D22. For example, when a user ID for using the virtual room 100 is directly designated, attributes and other information may be omitted. In any case, the information of the members may be appropriately set based on the designation of the user of the setter. Incidentally, the use of the virtual room 100 may be according to permission by the setter. In such case, for example, the fact that the permission of the user of the setter is required may be recorded as information relating to the members.

Information for distinguishing the content designated by the user relating to items such as the type of the virtual monitor 101, the equipment or furnishings of the virtual room 100, arrangement thereof, and background music may be recorded in room data D22 as information relating to the internal configuration. For example, when the virtual monitor 101, the interior, furniture, or the like are customized by selecting prepared parts, identification information such as a part number set for these parts may be described in the room data D22 in association with information designating a location.

Figure 2:
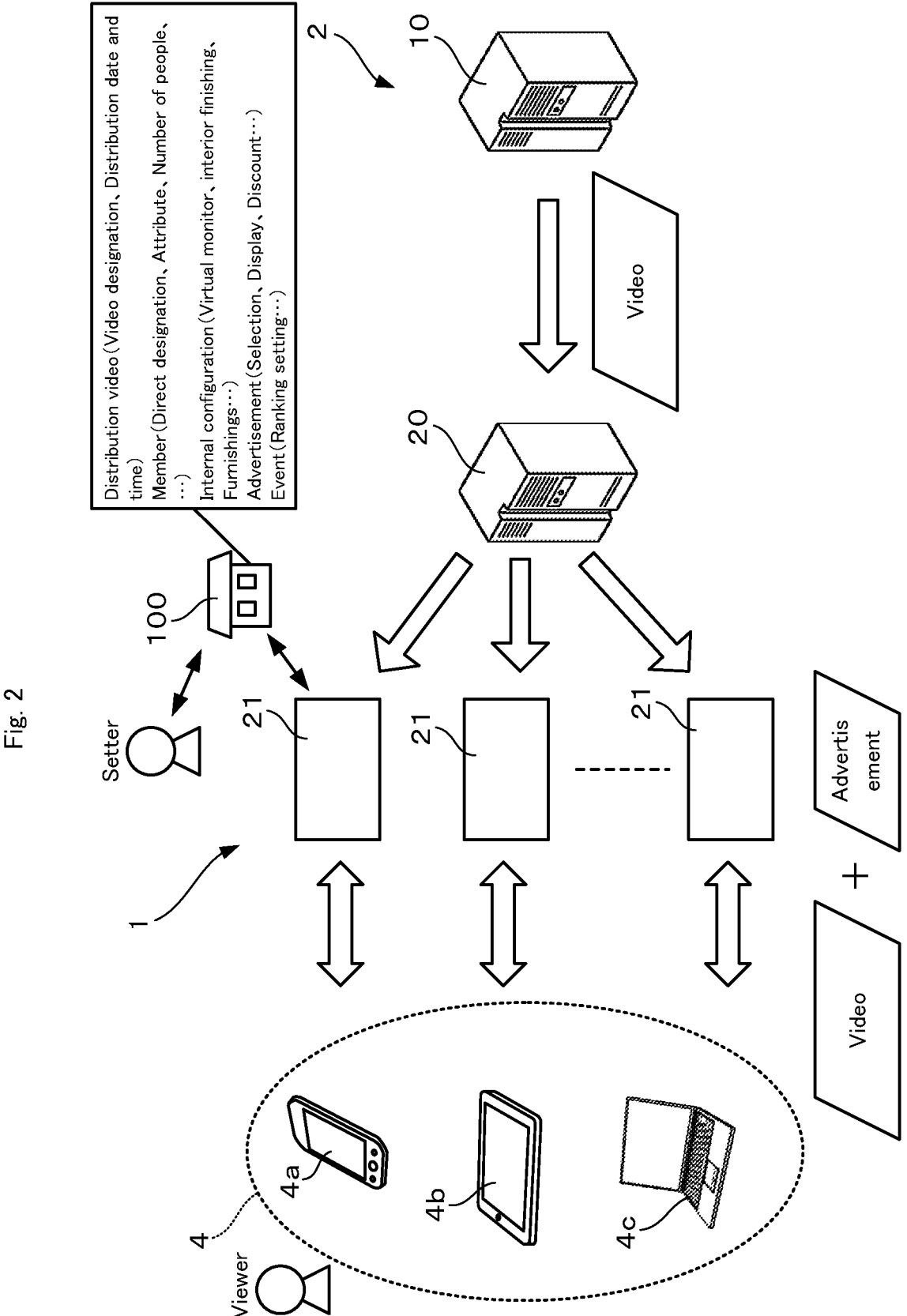
FIG. 2 is a diagram illustrating a summary of video distribution in the video distribution system according to one embodiment.

Information that designates each requirement relating to the selection of the advertisement described in FIG. 2 and requirements relating to display may be recorded in the room data D22 as information relating to the advertisement. The information relating to the selection may be recorded in a form directly designating the advertisement or in a form designating a trend of the advertisement. Automatic selection of advertisements may be designated. Information designating how the advertisement should be displayed such as a location where the advertisement should be displayed, a time when the advertisement should be displayed, the number of advertisements to be displayed, and the like may be recorded in the room data D22 as information relating to the display of the advertisement. When the discount conditions described above are set, information designating the discount conditions may be further recorded in the room data D22 as information relating to the advertisement.

Incidentally, when the discount conditions differ for each paid service, the discount conditions must be described in the room data D22 while distinguished for each advertisement associated with the paid service.

Information relating to an event is information for designating an event in which a user can participate in the virtual room 100. For example, information designating the type of event such as an inter-room ranking or an in-room ranking described above may be recorded as the information relating to the event. Incidentally, although omitted in FIG. 8, when the entry possible period is set for the virtual room 100, the start and end dates and times may be recorded in the room data D22.

FIG. 8 illustrates an example in which one distribution ID is recorded in the room data D22, but a plurality of distribution IDs may be recorded in association with one room ID. In such case, the requirement of a member or the like designating the specifications of the virtual room 100 may be set for each distribution ID or set in common for a plurality of distribution IDs. For example, when setting the distribution IDs corresponding to a plurality of videos of different genres, the requirements of members, internal configurations, advertisements, and the like may be changed according to the genre of the video.

FIG. 9 illustrates an example of viewing reservation data D23 stored in the viewing management database DB23. The viewing reservation data D23 is data created when the user selects the virtual room 100 and reserves viewing of a video. In the viewing reservation data D23, for example, a room ID of a virtual room 100 selected by the user, a distribution ID corresponding to distribution including a video that the user wishes to view, and the user ID of the reserved user are recorded in association with a reservation number uniquely numbered for each reservation.

FIG. 10 illustrates an example of a viewer list TB1 recorded in a viewing management database DB23 in order to distinguish a user acting as a viewer who has entered the virtual room 100. A viewer list TB1 is data in a table format in which information such as a user ID of the user acting as the viewer who has entered the virtual room 100, location information of the user, and user information is recorded while attaching a viewer number and is distinctively prepared for each room ID of the virtual room 100. The location information may be acquired by using a GPS function or the like of the user terminal device 4 or may be acquired based on network information provided from an access point, router, or the like used by the user terminal device 4 in a network connection. The location information may be acquired, for example, when the user logs in to the relay server 20. When the user terminal device 4 is a mobile terminal, it is preferable that the location information be updated as appropriate, but the location information acquired at a predetermined timing such as during login may be viewed as the location information of the user thereafter. The user information recorded in the viewer list TB1 may include, for example, user attributes and the like necessary for selecting an advertisement, and the information may be acquired from the user management database DB21 by using the user ID as a lead.

FIG. 11 illustrates an example of advertisement data D24 stored in the advertisement management database DB24. The advertisement data D24 is data created for each advertisement that can be displayed on the user terminal device 4 and is data that describes the details of the advertisement. For example, in the advertisement data D24, selection information to be referenced for selecting an advertisement, information of advertisement contents, and service provision information on a paid service to be provided in association with the advertisement may be recorded in association with unique advertisement IDs for each advertisement. The selection information is referenced when the setter selects an advertisement corresponding to the selection condition of the advertisement set as the specification of the virtual room 100. For example, information designating the type of the advertisement, or an attribute, trend, or the like of the user acting as the target of the advertisement may be recorded as selection information. When the trend of the advertisement is designated as a selection condition of the advertisement in the room data D22 in FIG. 8 or when automatic selection of the advertisement is designated, information necessary for selecting the advertisement corresponding to the selection condition may be recorded as selection information in the advertisement data D24. However, when the advertisement is directly designated in the room data D22, the advertisement ID may be designated in the room data D22.

Information relating to the advertisement contents is information describing the display contents of the advertisement in the user terminal device 4. For example, image data, text data, and the like to be displayed as an advertisement may be recorded as information of the advertisement contents. When a paid service is provided in association with the advertisement, information indicating the contents of the paid service and information of a directing destination such as an address of a website for providing the paid service may be recorded as the service provision information. Incidentally, the service provision information may be omitted when this is an advertisement not intended to direct to a paid service.

The advertisement data D24 may further include discount information. The discount information is information to be referenced when setting a discount condition for a paid service associated with the advertisement. For example, the discount information may include information indicating a range that can be set as a discount condition. When the setter of the virtual room 100 is different from the operator that provides the paid service, the discount conditions of the room data D22 may be set within the acceptable range by the operator as the advertiser showing the discount conditions that can be acceptable in advance in the advertisement data D24 because there is a possibility that excessive discounts beyond the acceptable limit of the operator providing the paid service will be applied if the discount conditions of the room data D22 are left to the setter's discretion.

Discount conditions in a plurality of tiers corresponding to the scale of the number of viewers using the virtual room 100 may be preset by discount information, and discount conditions corresponding to the number of viewers using the virtual room 100 may be referenced as discount conditions of the room data D22. In such case, the viewer count may be predicted from, for example, an allowable range of the number set as a specifications of the virtual room 100 or may be predicted based on the number of viewers reserving and the number of users actually entering the room before the main part of the video is started. Conversely, when the setter of the virtual room 100 coincides with the operator who provides the paid service, discount conditions that the setter of the virtual room 100 can allow may be directly set in the room data D22.

Figure 12:
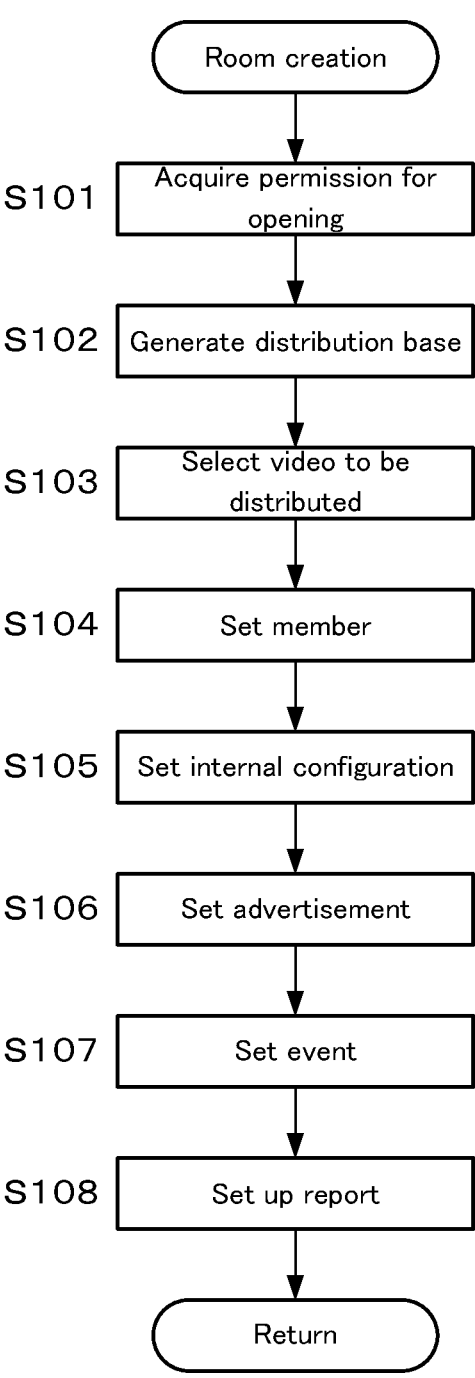
FIG. 12 is a flowchart illustrating one example of a procedure of a room creation process.

Next, a detailed example of various processing procedures executed by the delivery server 2 to realize video distribution using the virtual room 100 will be described with reference to FIGS. 12 to 18. FIG. 12 illustrates an example of a procedure of a room creation process executed by a room management part 22 of the relay server 20 to create the virtual room 100 based on an instruction from the setter. The room creation process is started by the setter instructing creation of the virtual room 100. Incidentally, user authentication for the setter may be performed by the relay server 20 for creating the virtual room 100, it may be distinguished whether the setter has the permissions to create the virtual room 100, and the process illustrated in FIG. 12 may be started only when the setter has the creation permissions.

When the room creation process is started, the room management part 22 first acquires permission for opening a new distribution base 21 corresponding to the virtual room 100 (step S101). The permission may be acquired from, for example, the distribution source server 10. When comprehensive permission for the creation of the new distribution base 21 is given from the distribution source server 10 to the relay server 20, the permission may be applied as an permission regarding the opening of the new distribution base 21. In any case, the permission for opening the distribution base 21 may be a system in which the permission is individually acquired for each distribution base 21 from the distribution source server 10 or a system in which the relay server 20 processes an individual permission based on a comprehensive permission from the distribution source server 10.

When the establishment permission is obtained, the room management part 22 generates the distribution base 21 (step S102). For example, the room management part 22 generates an address positioned as the distribution base 21 and records the address in the room data D22 as information of the distribution base. In such case, information such as the address specifying the distribution base 21 may be reported from the relay server 20 to the distribution source server 10, and the distribution source server 10 may record the information in the distribution management database DB11.

Next, the room management part 22 selects the video to be distributed based on an instruction of the setter (step S103). For example, the room management part 22 acquires the distribution schedule data D11 from the distribution source server 10, appropriately acquires information of a title and a summary of the video data D12 corresponding to the video ID included in the acquired distribution schedule data D11, presents the video scheduled to be distributed together with the distribution date, time, title, and summary to the setter, and according to an instruction of the setter, selects any record from the records included in the distribution schedule data D11 and records the distribution ID in the room data D22.

When the video to be distributed is selected, the room management part 22 subsequently sets the requirements of the members, internal configurations, advertisements, and events as the specifications of the virtual room 100 based on an instruction of the setter and records the content of the settings in the room data D22 (step S104 to S107). Due to the above processing, the new distribution base 21 is set, and a virtual room 100 corresponding to the distribution base 21 is created. Incidentally, a portion of the requirements that define the specifications of the virtual room 100 may be set on the relay server 20 and, and changes by the setter may be impossible.

Afterward, the room management part 22 sets up a report relating to the newly created virtual room 100 (step S108). For example, the room management part 22 may set up a report to the user of the new virtual room 100 by setting up a push notification to a notification destination of the user registered in the user management database DB21 or by setting up listing of information of the virtual room 100 on a website for the user provided by the relay server 20.

When the report of the virtual room 100 is set, the room management part 22 ends the process in FIG. 12. Furthermore, the processing of steps S103 to S108 is not limited to a stage at which the virtual room 100 is newly created, and the room management part 22 may be configured to be able to execute according to a request of the setter even after creating the virtual room 100. Thereby, the setter can appropriately correct or change the video to be distributed of the virtual room 100 or the specifications thereof.

FIG. 13 illustrates an example of a procedure of a room report process executed by the room management part 22 to report to the user information of the virtual room 100. The room management part 22 repeatedly executes the process in FIG. 13 in an appropriate cycle. When the room report process is started, the room management part 22 selects a virtual room 100 to be reported (step S111). For example, a virtual room 100 for which reporting to the user is set up in step S108 in FIG. 12 may be selected as the report target. After the setup in step S108, a virtual room 100 for which a predetermined period has elapsed or is selected as a report target a predetermined number of times or a virtual room 100 for which the remaining time until the start time of video distribution is less than a predetermined value may be excluded from being a report target.

Next, the room management part 22 acquires the room data D22 of the virtual room 100 selected as the report target, and extracts information to be reported based on the room data D22 (step S112). For example, the video to be distributed of the virtual room 100, the distribution time thereof, the internal environment, and the like may be extracted as information to be reported. Afterward, the room management part 22 reports to the user the virtual room 100 based on the information extracted in step S112 (step S113). The report may be a push notification or a pull notification, as described above. When the process of step S113 is completed, the room management part 22 ends the process in FIG. 13.

FIG. 14 illustrates an example of a procedure of a room entry management process executed by the viewing management part 23 to manage the entry of the user to the virtual room 100. When the user requests entry into the virtual room 100, the viewing management part 23 starts the process in FIG. 14, and first selects the virtual room 100 to be entered based on an instruction of the user (step S121). This process may be performed by a procedure such as extracting virtual rooms 100 for which entry is possible at the present time from the room management database DB22, presenting the obtained virtual rooms 100 to the user as entry candidates, and selecting an entry target based on an instruction of the user. Alternatively, in the room report process in FIG. 13, a link that directs the user to an entry request may be included in the contents of the report, and the virtual room 100 that is directed to according to the link may be selected as the entry target.

Next, the viewing management part 23 distinguishes whether the user meets the requirements necessary for entry based on room data D22 relating to the virtual room 100 to be entered (step S122). The requirements distinguished in this case are requirements for limiting the user among requirements set relating to the specifications of the virtual room 100. For example, it is distinguished whether the user meets the member requirements described in the room data D22. As an example of specifications of the virtual room 100, when a geographic requirement limiting a location of a member is set in room data D22, the viewing management part 23 acquires location information of the user who wants to enter the room, and from the acquired position information, it may be distinguished whether the user meets the geographic requirement as one of the entry requirements. As described in relation to FIG. 10, the location information may be acquired from GPS information of the user terminal device 4 or network information of an access point or the like. The timing for acquiring the location information is not limited to the processing time of step S122, and it may be acquired at an earlier time, for example, when the user logs in to the relay server 20.

When the entry requirements are met in step S122, the viewing management part 23 permits user entry (step S123) and registers the user ID, location information, user information, and the like of the user that entered in the viewer list TB1 corresponding to the room ID of the entered virtual room 100 (step S124). Next, the viewing management part 23 starts a process of displaying an image (may be a moving image) representing the inside of the virtual room 100 that has been entered on the user terminal device 4 (step S125). The internal configuration described in the room data D22 is reflected in the image. When display of the image is started, the viewing management part 23 ends the process in FIG. 14. Meanwhile, if the entry requirements are not met in step S122, the viewing management part 23 does not permit entry (step S126), notifies the user terminal device 4 of such, and ends the process in FIG. 14.

In the process described above, although user entry is permitted when it is determined that the entry requirements are met in step S122, when, for example, a minimum number of people is set as a specification of the virtual room 100, the user may be made to wait in a state prior to entry in step S123, and at a time when the number of users waiting for entry reaches the minimum number of people, entry of waiting users may be permitted, and the process may proceed to step S124. The configuration may be such that the user who enters the room can leave the virtual room 100 at an appropriate timing based on an instruction of the user. When the user leaves, the viewing management part 23 deletes the leaving user from the viewer list TB1.

Figure 15:
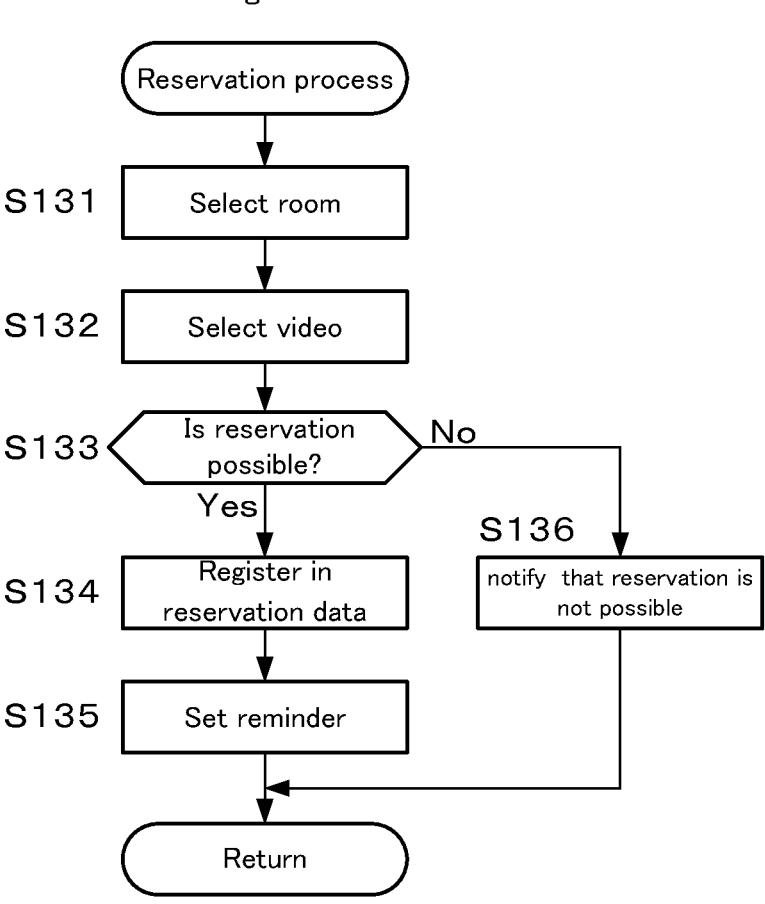
FIG. 15 is a flowchart illustrating one example of a procedure of a reservation process.

FIG. 15 illustrates an example of a procedure of a reservation process executed by the viewing management part 23 to accept a reservation relating to viewing of a video. When the user requests a reservation to view the video, the viewing management part 23 starts the process shown in FIG. 15 and first selects the virtual room 100 to be reserved based on an instruction of the user (step S131). This process may also be performed by a method similar to the entry process, such as extracting virtual rooms 100 that can be reserved at the present time from the room management database DB22, presenting the obtained virtual rooms 100 to the user as selection candidates, and selecting a reservation target based on an instruction of the user. Alternatively, in the room report process in FIG. 13, a link that directs the user to a reservation request may be included in the contents of the report, and the virtual room 100 that is directed to according to this link may be selected as the reservation target.

Next, the viewing management part 23 selects the video to be reserved based on an instruction of the user (step S132). This process is a process for selecting a distribution ID of a video scheduled to be distributed in the virtual room 100 selected in step S131. When directing the user to the reservation from the report contents, the user may be made to select the video at the time of directing, and this selection may be confirmed in step S132. Incidentally, the process of step S131 and step S132 may be interchanged in order. In other words, the video to be viewed may first be selected based on an instruction of the user, and the virtual room 100 where the video is scheduled to be distributed may be selected based on an instruction of the user.

When the virtual room 100 and the video to be reserved are selected, the viewing management part 23 distinguishes whether the reservation is possible (step S133). For example, it may be distinguished whether this is within the reservation accepting period (see FIG. 5) set for the video to be viewed. Additionally, whether the user can enter the virtual room 100 may be distinguished for whether reservation is possible by referring to member requirements described in the room data D22 of the virtual room 100 to be reserved. However, the member requirements may be distinguished at the time of entering the room after the reservation is made, and whether the member requirements are met need not be asked at the reservation stage. When using the reserved number of users to predict the number of viewers, it is preferable to distinguish whether the member requirements are met in step S133, that is, whether the user is permitted for entry to the virtual room 100. When geographical requirements are included in the member requirements, the location of the user terminal device 4 may change during actual viewing, and therefore, it may be set to not be asked in step S133.

When it is determined that the reservation is possible in step S133, the viewing management part 23 registers the distribution ID of the video to be reserved and the user ID of the user who made the reservation in the reservation data D23 corresponding to the room ID of the virtual room 100 to be reserved (step S134). Furthermore, the viewing management part 23 sets a reminder for the reservation (step S135) and then ends the process in FIG. 15. When a reminder is set up in step S135, the viewing management part 23 notifies of the reservation reminder at a predetermined time earlier than the distribution time of the video of the reserved distribution ID. When it is determined that the reservation is not possible in step S133, the viewing management part 23 notifies the user that the reservation is not possible (step S136) and then ends the process in FIG. 15.

Figure 16:
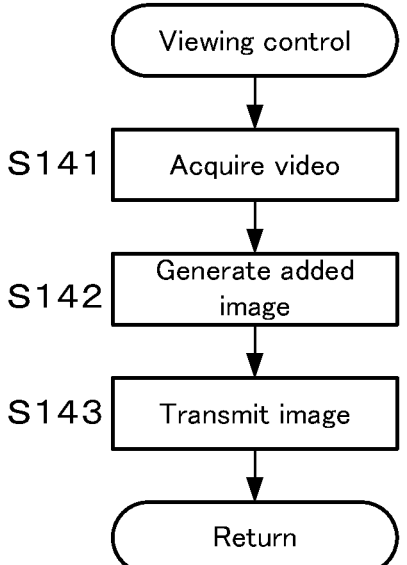
FIG. 16 is a flowchart illustrating one example of a procedure of a viewing control process.

FIG. 16 illustrates one example of a procedure of a viewing control process executed by the viewing management part 23 to allow the user to view a video distributed from the distribution source server 10 via the virtual room 100. The process in FIG. 16 is executed distinctively for each virtual room 100 and is executed repeatedly according to a predetermined frame rate. FIG. 16 illustrates a procedure handling one virtual room 100. When the distribution start time of the video corresponding to the distribution ID set for the virtual room 100 arrives, the viewing management part 23 starts the process in FIG. 16, first acquires the video distributed from the distribution source server 10 (step S141), and generates an image of the virtual room 100 in which the video is displayed on the virtual monitor 101 by adding the video to the virtual monitor 101 of the virtual room 100 (step S142). In this case, when the virtual room 100 is configured as a three-dimensional virtual space, the virtual camera is operated according to an operation of the user to generate an image of the virtual room 100 from a location designated by the user. When depicting the virtual room 100, the room data D22 is referenced such that the internal configuration and the like based on the instruction of the setter are reflected in the image of the virtual room 100. Furthermore, the viewing management part 23 transmits the obtained image to the user terminal device 4 as an image corresponding to one frame (step S143) and then ends the current routine. By repeating the process in FIG. 16, a moving image expressing a state of viewing a video via the virtual monitor 101 in the virtual room 100 is distributed to the user terminal device 4 by streaming. Incidentally, FIG. 16 is a processing example in which a moving image displaying the state of the virtual room 100 is generated on the relay server 20 end, but as described above, the video to be viewed may be distributed from the relay server 20 and an image of the virtual room 100 where this video is added to the virtual monitor 101 may be generated on the user terminal device 4 end. In this case, the process of step S142 may be repeatedly executed on the user terminal device 4 end.

Figure 17:
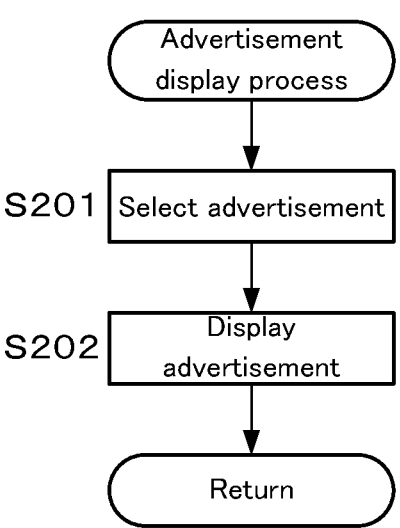
FIG. 17 is a diagram illustrating one example of a procedure of an advertisement display process.

FIG. 17 illustrates an example of a procedure of an advertisement display process executed by the advertisement management part 24 for displaying an advertisement on the user terminal device 4 of the user of the virtual room 100. The process in FIG. 17 is also executed distinctively for each virtual room 100. The advertisement management part 24 repeatedly executes the process in FIG. 17 at an appropriate cycle when the virtual room 100 is within the entry possible period (see FIG. 5). When the advertisement display process is started, the advertisement management part 24 distinguishes the selection conditions and display conditions of the advertisement recorded in the room data D22 and selects the advertisement to be displayed by selecting the advertisement data D24 meeting these conditions from the advertisement management database DB24 (step S201). For example, when the advertisement ID is designated in the room data D22, the advertisement data D24 of the designated advertisement ID may be selected, and when a trend or the like of the advertisement is designated, the advertisement data D24 including selection information conforming to the trend may be selected. Furthermore, when a display count, display time, or the like is designated as display conditions of the advertisement, the advertisement data D24 may be selected within the range of these conditions such that the advertisement to be displayed is appropriately switched.

When the advertisement is selected, the advertisement management part 24 instructs the viewing management part 23 to display the selected advertisement together with the information of an advertisement (step S202). Thus, the advertisement is displayed in association with the virtual room 100. The display location of the advertisement may be within the virtual room 100 or may be displayed distinctively outside the virtual room 100. The advertisement may be displayed so as to be added to the video displayed on the virtual monitor 101. When displaying an advertisement based on the advertisement data D24 for which a paid service and discount conditions are set, the contents of the paid service and the discount conditions may be presented to the user together with the advertisement. When the instruction of step S202 is completed, the advertisement management part 24 ends the process illustrated in FIG. 17 of this time.

Figure 18:
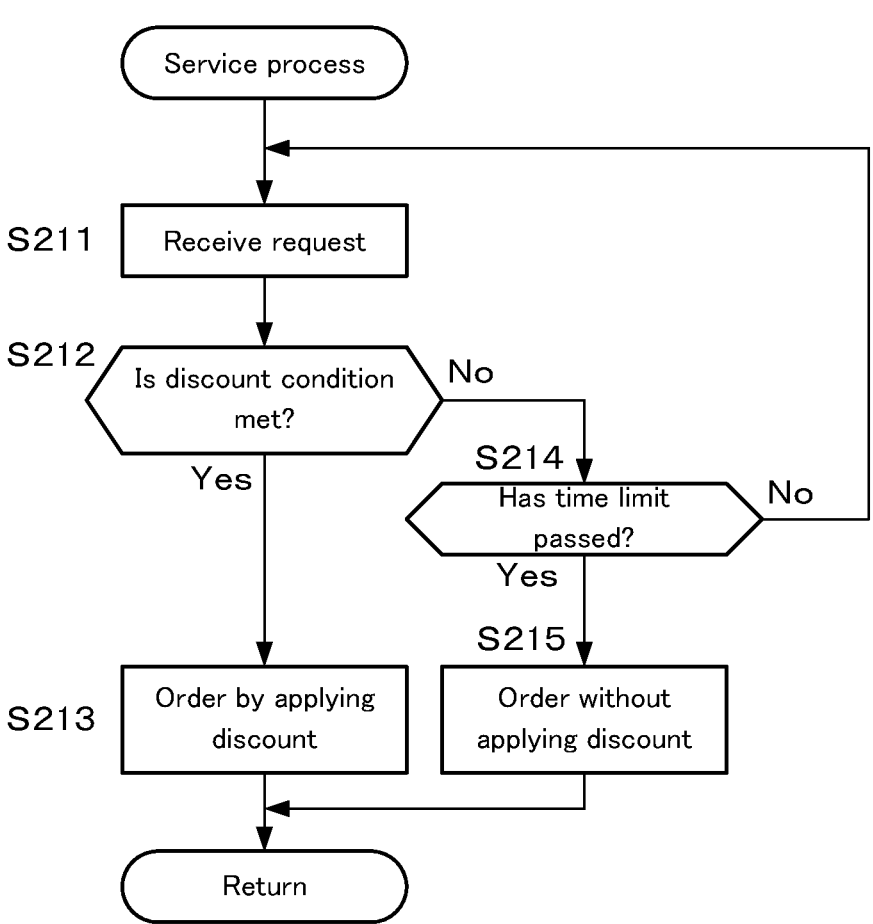
FIG. 18 is a flowchart illustrating one example of a procedure of a service process.

FIG. 18 illustrates one example of a procedure of a service process executed by the advertisement management part 24 when a user requests use of a paid service associated with an advertisement. The process in FIG. 18 is also a process executed distinctively for each virtual room 100. When the user using the virtual room 100 performs a predetermined operation such as clicking an advertisement, use of the paid service associated with the advertisement is requested from the relay server 20. In response to this request, the advertisement management part 24 starts the service process in FIG. 18, first receives a request from the user terminal device 4, and acquires information for specifying request contents for use of the paid service (step S211). For example, the received request may be temporarily stored as service acceptance data in an internal storage device of the relay server 20. At this stage, it may at the least be distinguished which paid service was requested. For example, the paid service can be distinguished by acquiring the advertisement ID corresponding to the service requested by the user. In step S221, the contents of the product or service purchasable on the website 120 and the charge thereof may be presented to the user, and the user may be made to instruct the purchase contents and the contents thereof recorded in the service acceptance data. Alternatively, the user may be guided to the website 120 associated with the advertisement to proceed with an order procedure of the product or the like. However, in the case of a service for which discount conditions have been set, the process of confirmation of the purchase price and settlement of the price is suspended at least until confirmation of whether the discount conditions are satisfied.

Next, the advertisement management part 24 distinguishes whether the discount conditions described in the room data D22 are met in relation to the paid service requested by the user (step S212). For example, whether the number of users requesting the use of the service meets the number of people condition may be distinguished based on service acceptance data. When an area condition is set as a discount condition, it may be distinguished whether the user is located in a predetermined target area by referencing the location information of the viewer list TB1. The location information may be updated to the latest information at the time of the process in FIG. 18. Incidentally, when it is distinguished whether the discount conditions are satisfied in step S212, the progress state thereof may be presented to the user terminal devices 4 of the user group using the same virtual room 100. For example, when a target number of people range is set as a discount condition, information such as how many more people need to apply until the discount will be applied or to how many more people the discount can be applied is displayed on the user terminal device 4 to prompt the user to use such.

When the discount conditions are met, the advertisement management part 24 sends an order to the website 120 for products or the like by applying the discount according to the request content recorded in the service request data (step S213) and then ends the process of FIG. 18. Conversely, when the discount conditions are not met, the advertisement management part 24 distinguishes whether the time limit designated by the discount conditions has passed (step S214), and when the time limit has not passed, the process returns to step S211. Conversely, when the time limit has passed, the advertisement management part 24 sends an order to the website 120 for products or the like without applying the discount according to the request content recorded in the service request data (step S215) and then ends the process of FIG. 18.

The process of FIG. 18 is a process in which, while recruiting users who use a paid service by repeating steps S211, S212, and S214, if the discount conditions are met, the service is ordered in bulk with a discount applied in step S213, and if the discount condition is not met, the service is ordered in bulk without a discount applied in step S215. In this case, whether the discount is applied is determined prior to the actual order, and therefor it is possible to flexibly process the user's request according to whether a discount is applied, such as by cancelling at least a portion of the user's request or giving an opportunity to change the request content when, for example, the discount is not applied.

The provision of the paid service and the application of a discount to the use thereof are not limited to the example in FIG. 18, and various modifications are possible. For example, as described above, while directing the user to the website 120 in step S211 to confirm the use content of the service, the confirmation of the fee may be suspended until the determination in step S212 is confirmed, and the service process may be executed so as to proceed to the settlement of the fee after the determination in step S212 is confirmed. For example, in a service that requires the time required from an order to delivery of a product such as food or drink to be set to about an hour or a shorter time, there is a possibility that delivery will be delayed and will not match the user's intent when waiting for confirmation of whether the discount conditions are satisfied. In such a case, delivery preparation may proceed on the website 120 end in response to a request for using the service, and the process may proceed to charge confirmation and settlement while waiting to confirm whether the discount conditions are satisfied.

When the service collects a charge when receiving the product, the adaptability of such a process is high. Furthermore, the process of FIG. 18 may be handled by a server on the website 120 end instead of the relay server 20 or in cooperation with the relay server 20.

In the above embodiments, the room management part 22 of the relay server 20 functions as an example of the distribution base setup unit by executing the processes of steps S101 to S107 in FIG. 12, and the viewing management part 23 functions as an example of the viewing control unit by executing the processes of steps S141 to S143 in FIG. 16. Furthermore, the advertisement management part 24 of the relay server 20 displays an advertisement according to the processes of steps S201 and S202 in FIG. 17 and receives a usage request of a service in step S211 in FIG. 18, thereby functioning as an example of the opportunity providing unit, and the advertisement management unit 24 functions as an example of the service presentation unit by executing the processes of steps S201 and S202 in FIG. 17. In addition, due to the room management part 22 executing the processes of steps S111 to S113 of FIG. 13, it functions as an example of the report unit. The room management part 22 also functions as an example of the virtual space setup unit by executing the processes of step S103 to S107 in FIG. 12.

The present invention is not limited to the embodiments described above and may be implemented in a form in which appropriate modifications or changes have been made. For example, the distribution base 21 need not necessarily be set on the assumption that it is shared by two or more users. For example, it is acceptable for a single user to act as the setter themselves and set a dedicated distribution base that they view. In this case, for example, the member requirement as a specification of the virtual space 100 may be set so as to be limited to the user of the setter. The distribution base need not necessarily be associated with a virtual space. The video may be viewed via a general-purpose web browser or the like installed on the user terminal device. That is, the virtual space audiovisually characterizes a viewing environment of the video, and when such an element is not necessary, the virtual space need not be set, and specifications such as member requirements and the like may be set as specifications of the distribution base itself. Incidentally, by generating a moving image showing the state of the virtual room 100 on the user terminal device 4 end, the distribution server 2 and the user terminal device 4 may cooperate to realize the viewing control unit. A benefit such as a discount need not necessarily be prepared in relation to use of the paid service. In addition, providing an opportunity to use the paid service is not essential, and for example, an advertisement may be associated with the virtual space and be displayed, and may promote a specific product or service to a user. Even in such an advertisement display, it is possible to advertise the paid service associated with the advertisement to the user and motivate the user to use the paid service separately. Furthermore, the display of the advertisement may also be omitted as appropriate. Alternatively, the distribution unit is not limited to an example in which the distribution source server 10 and the relay server 20 are combined. The relay server 20 may be omitted by setting up an appropriate number of distribution bases 21 in the distribution source server 10.

Various aspects of the present invention derived from respective embodiments and modified examples described above will be described below. Furthermore, in the description below, the corresponding constituent elements illustrated in the attached drawings are added in parentheses to facilitate understanding of each embodiment of the present invention, but the present invention is not limited thereby to the illustrated form.

The video distribution system according to the first aspect of the present invention is a video distribution system (1) comprising a computer (20) provided with a relay unit (20) for relaying and distributing a video to be viewed which is distributed from a predetermined distribution source (10) to a user terminal device (4) used by each of a plurality of users, wherein the computer serves as: a distribution base setup unit (22, S101 to S107) that obtains permission from the distribution source and sets up, on the relay unit, a distribution base (21) as a unit for relaying and distributing the video to the user terminal device; and a viewing control unit (23, S141 to S143) that relays and distributes the video from the distribution source to the user terminal device of a user via the distribution base used by the user.

The video distribution control method according to the first aspect of the present invention is a video distribution control method applied to a video distribution system (1) provided with a relay unit (20) for relaying and distributing a video to be viewed which is distributed from a predetermined distribution source (10) to a user terminal device (4) used by each of a plurality of users, wherein the video distribution control method includes: a step (S101 to S107) that obtains permission from the distribution source and sets up, on the relay unit, a distribution base (21) as a unit for relaying and distributing the video to the user terminal device; and a step (S141 to S143) that relays and distributes the video from the distribution source to the user terminal device of a user via the distribution base used by the user.

The non-transitory computer readable storage medium according to the first aspect of the present invention stores a computer program (PG2) applied to a video distribution system (1) provided with a relay unit (20) for relaying and distributing a video to be viewed which is distributed from a predetermined distribution source (10) to a user terminal device (4) used by each of a plurality of users, wherein the computer program is configured to cause a computer of the video distribution system to function as: a distribution base setup unit (22, S101 to S107) that obtains permission from the distribution source and sets up, on the relay unit, a distribution base (21) as a unit for relaying and distributing the video to the user terminal device; and a viewing control unit (23, S141 to S143) that relays and distributes the video from the distribution source to the user terminal device of a user via the distribution base used by the user.

According to the aspect described above, because the configuration is such that the video from the distribution source is relayed at the distribution base of the relay unit and distributed to the user terminal device, the distribution source may distribute the video with the relay unit as the distribution destination regardless of the setup state of the distribution base in the relay unit, and the distribution source need not manage the distribution base on the relay unit. Accordingly, by setting up a plurality of distribution bases while reducing the scale of the user group that uses the distribution bases to a comparatively small scale, it is possible to simultaneously achieve both an appropriate scale of the place where video is viewed and ensure the number of views. In addition, the distribution base of the relay unit is provided based on permission from the distribution source, and thus the possibility of unauthorized viewing of the video can be eliminated.

In the aspect described above, the distribution base setup unit may set up the distribution base such that at least a portion of the specifications that characterize the distribution base are defined based on an instruction of a predetermined setter. Thus, the range of the user group using the distribution base can be narrowed down to the range intended by the setter through the specifications of the distribution base, and the distribution base can be positioned as a place where the video is viewed within the range of the user group intended by the setter.

The distribution base setup unit can set a plurality of distribution bases such that the specifications are different from each other, and the viewing control unit may select the distribution base used by the user based on an instruction of the user. Accordingly, by providing a plurality of distribution bases of different specifications, a distribution base suitable for each user can be prepared.

Furthermore, same one distribution base may be able to be shared by two or more users. Thus, the distribution base can be made to function as a place where a plurality of users view the video together.

The distribution base setup unit can set, as at least a portion of the specifications, a requirement for limiting the users who can use the distribution base based on an instruction of the setter, and the viewing control unit may determine based on the requirement whether the user can use the distribution base, and relay and distribute the video only to user terminal devices of users who are permitted to use the distribution base. Accordingly, the user group sharing the distribution base can be reliably narrowed down to a range according to the intent of the setter via a limited requirement set acting as the specifications of the distribution base.

In the above aspect, the video distribution system may comprise an opportunity providing unit (24, S201, S202, S211) that provides a user group sharing the distribution base with an opportunity to use a predetermined paid service via the user terminal device. Accordingly, by providing an opportunity to use a paid service to the user group sharing the distribution base, a commercial opportunity relating to the paid service can be created.

The distribution base setup unit may set, as at least a part of the specification, a paid service that the user group can use based on an instruction from the setter, and the opportunity providing unit may provide an opportunity to use the paid service set by the distribution base setup unit. Accordingly, it is possible to reflect the intent of the setter as relating to what kind of paid service is used. By setting a paid service matching the intent of the setter relating to what range a user group for which a distribution base can be used is set to, it is possible to provide a paid service suitable for the user group sharing the distribution base and reliably create or expand commercial opportunities.

In the above aspect, the present invention may be further provided with a service presentation unit (S24, S201, S202) that presents a paid service for which the opportunity providing unit provides the opportunity to the user group sharing the distribution base. Accordingly, it is possible to prompt the users using the distribution base to use the paid service by making them reliably aware of what kind of paid service is available.

The service presentation unit may present the paid service by displaying an advertisement (102) corresponding to the paid service on the user terminal device. Accordingly, it is possible to direct the user to use of the paid service through the advertisement.

In the aspect described above, the video distribution system may comprise a report unit (22, S111 to S113) that reports to the user such that it possible to identify at least a portion of the specifications of the distribution base set by the distribution base setup unit. Accordingly, it is possible to inform the user of the distribution base and prompt the user to use it.

The distribution base setup unit may select any video from a plurality of video candidates based on an instruction from the setter and set the selected video as the video to be viewed which is to be distributed to the user terminal device. Accordingly, the user can be made to view the video intended by the setter.

The distribution base setup unit may set up a virtual space (100) including a virtual monitor (101) for displaying the video in association with the distribution base and set at least a portion of the specification of the distribution base by setting at least a part of items that characterize the virtual space, and the viewing control unit may cause display, on the user terminal device of the user using the distribution base, a moving image expressing a state of viewing the video via the virtual monitor in the virtual space associated with the distribution base. Accordingly, the distribution base can be positioned as a place to view the video via the virtual space, and a viewing environment of the video matching to the intent of the setter can be created.

The video distribution system according to the second aspect of the present invention is a video distribution system (1) comprising a computer (20) provided with a distribution unit (2) in which a distribution base (21) that can be shared by at least two users is set up as a unit for distributing a video, the video distribution system being for distributing the video to be viewed from the distribution unit to a user terminal device (4) used by each of a plurality of users, wherein the computer serves as: a virtual space setup unit (22, S103 to S107) that sets up and associates with the distribution base a virtual space (100) including a virtual monitor (101) for displaying the video, such that at least a portion of specifications that characterize the virtual space are defined based on an instruction from a predetermined setter; and a viewing control unit (23, S141 to S143) that displays, on user terminal devices of a user group sharing same one distribution base, a moving image expressing a state of viewing the video via the virtual monitor in the virtual space associated with the distribution base.

The video distribution control method according to the second aspect of the present invention is a video distribution control method applied to a video distribution system (1) provided with a distribution unit (2) in which a distribution base (21) that can be shared by at least two users is set up as a unit for distributing a video, the video distribution system being for distributing the video to be viewed from the distribution unit to a user terminal device (4) used by each of a plurality of users, wherein the video distribution control method includes: a step (S103 to S107) that sets up and associates with the distribution base at least one virtual space (100) including a virtual monitor (101) for displaying the video, such that at least a portion of specifications that characterize the virtual space are defined based on an instruction from a predetermined setter; and a step (S141 to S143) that displays, on user terminal devices of a user group sharing same one distribution base, a moving image expressing a state of viewing the video via the virtual monitor in the virtual space associated with the distribution base.

The non-transitory computer readable storage medium according to the second aspect of the present invention stores a computer program (PG2) applied to a video distribution system (1) provided with a distribution unit (2) in which a distribution base (21) that can be shared by at least two users is set up as a unit for distributing a video, the video distribution system (1) being for distributing the video to be viewed from the distribution unit to a user terminal device used by each of a plurality of users, wherein the computer program is configured to cause computer (20) of the video distribution system to function as: a virtual space setup unit (22, S103 to S107) that sets up and associates with the distribution base at least one virtual space (100) including a virtual monitor (101) for displaying the video, such that at least a portion of specifications that characterize the virtual space are defined based on an instruction from a predetermined setter; and a viewing control unit (23, S141 to S143) that displays, on user terminal devices of a user group sharing same one distribution base, a moving image expressing a state of viewing the video via the virtual monitor in the virtual space associated with the distribution base.

According to the aspect described above, by defining at least a portion of the specifications of the virtual space set for the distribution base based on the instruction of the setter, the intent of the setter can be reflected through the specifications of the virtual space relating to the environment in which the video to be viewed is allowed to be viewed. Thus, the user group intended by the setter is gathered in the virtual space, and the virtual space can be made to function as a place where the user groups view the video together. By narrowing down trends of the user groups gathering in the virtual space to the range intended by the user, it is possible to create a commercial opportunity suitable for the user groups by making assumptions on the user group using the virtual space.

In the aspect described, a plurality of distribution bases are set up in the distribution unit, the virtual space setup unit can set up the virtual space with specifications different from each other for each of the plurality of distribution bases, and the viewing control unit may select the distribution base used by the user based on an instruction of the user. Accordingly, by appropriately providing virtual spaces of different specifications, it is possible to provide a virtual space suitable for the user.

The virtual space setup unit can set, as at least a portion of the specifications, a requirement for limiting the users who can use the distribution base based on an instruction of the setter, and the viewing control unit may determine based the requirement whether the user can use the distribution base, and display the moving image only on the user terminal devices of the users who are permitted to use the distribution base. Accordingly, the user group gathering in the virtual space can be reliably narrowed down to a range according to the intent of the setter via a limited requirement set acting as the specifications of the virtual space.

The virtual space setup unit may set, as at least the portion of the specifications, an internal configuration of the virtual space that the user can recognize via the user terminal device based on an instruction of the setter. By reflecting the intent of the setter in the internal configuration of the virtual space, it is possible to narrow down the user group gathering in the virtual space to a range in which the internal configuration is preferred or acceptable.

In the above aspect, the video distribution system may comprise an opportunity providing unit (24, S201, S202, S211) that provides a user group sharing the distribution base with an opportunity to use a predetermined paid service via the user terminal device. Accordingly, by providing an opportunity to use a paid service to the user group sharing the virtual space, a commercial opportunity relating to the paid service can be created.

The virtual space setup unit may set, as at least a part of the specifications, a paid service that the user group can use based on an instruction from the setter, and the opportunity providing unit may provide an opportunity to use the paid service set by the virtual space setup unit. Accordingly, it is possible to reflect the intent of the setter as relating to what kind of paid service is used. By setting a paid service matching the intent of the setter concerning what manner of users to gather in the virtual space, it is possible to provide a paid service suitable for the user group sharing the virtual space and reliably create or expand commercial opportunities.

In the above aspect, the present invention may comprise a service presentation unit (S24, S201, S202) that presents a paid service for which the opportunity providing unit provides an opportunity to the user group sharing the distribution base. Accordingly, it is possible to prompt the users using the virtual space to use the paid service by making them reliably aware of what kind of paid service is available.

The service presentation unit may present the paid service by displaying an advertisement (102) corresponding to the paid service on the user terminal device in association with the virtual space. Accordingly, it is possible to direct the user to use of the paid service through the advertisement.

The virtual space may be set up so as to virtually reproduce a real space where a plurality of visitors gather to view the video together. Thus, the atmosphere of a real space for viewing the video together can be reproduced on the user terminal device, and motivation for viewing the video via the virtual space can be provided to the user. For example, it can be expected that a user in circumstances in which it is difficult to go to a real space is given a strong motivation to view a video using the virtual space.

In the aspect described above, the video distribution system may be further provided with a report unit (22, S111 to S113) that reports to the user such that it possible to identify at least a portion of the specifications of the virtual space set by the virtual space setup unit. Accordingly, it is possible to inform the user of the virtual space and prompt the user to use it.

The virtual space setup unit may select any video from a plurality of video candidates based on an instruction from the setter and set the selected video as the video to be viewed which is to be distributed to the user terminal device. Accordingly, the users intended by the setter can be gathered in the virtual space through the selection of the video.

Incidentally, the computer program that relates to the first and second aspects of the present invention may be provided in a state stored in a storage medium. By using this storage medium, for example, by installing and executing the computer program related to the present invention in the computer, the system of the present invention can be realized by using the computer. The storage medium that stores the computer program may be a non-volatile storage medium such as a CDROM.

The invention claimed is:

1. A video distribution system comprising a computer provided with a relay unit for relaying and distributing a video to be viewed which is distributed from a distribution source to a user terminal device used by each of a plurality of users, wherein the computer serves as:

a distribution base setup unit that obtains permission from the distribution source and sets up, on the relay unit, a distribution base as a unit for relaying and distributing the video to the user terminal device;

a viewing control unit that relays and distributes the video from the distribution source to the user terminal device of a user via the distribution base used by the user; and an opportunity providing unit that provides a user group sharing the distribution base with an opportunity to use a paid service via the user terminal device, wherein the distribution base setup unit sets up the distribution base such that at least a portion of specifications that characterize the distribution base are defined based on an instruction of a setter, and wherein same one distribution base is able to be shared by two or more users.

2. The video distribution system according to claim 1, wherein the distribution base setup unit can set a plurality of distribution bases such that the specifications are different from each other, and the viewing control unit selects the distribution base used by the user based on an instruction of the user.

3. The video distribution system according to claim 1, wherein the distribution base setup unit can set, as the at least a portion of the specifications, a requirement for limiting the users who can use the distribution base based on the instruction of the setter, and the viewing control unit determines based on the requirement whether the user can use the distribution base, and relays and distributes the video only to user terminal devices of users who are permitted to use the distribution base.

4. The video distribution system according to claim 1, wherein the distribution base setup unit sets, as the at least a portion of the specifications, the paid service that the user group can use based on the instruction from the setter, and the opportunity providing unit provides an opportunity to use the paid service set by the distribution base setup unit.

5. The video distribution system according to claim 1, comprising a service presentation unit that presents the paid service for which the opportunity providing unit provides the opportunity to the user group sharing the distribution base.

6. The video distribution system according to claim 5, wherein the service presentation unit presents the paid service by displaying an advertisement corresponding to the paid service on the user terminal device.

7. The video distribution system according to claim 1, further comprising a report unit that reports to the user such that it possible to identify the at least a portion of the specifications of the distribution base set by the distribution base setup unit.

8. The video distribution system according to claim 1, wherein the distribution base setup unit selects any one video from a plurality of video candidates based on the instruction from the setter and sets the selected video as the video to be viewed which is to be distributed to the user terminal device.

9. The video distribution system according to claim 1, wherein the distribution base setup unit sets up a virtual space including a virtual monitor for displaying the video in association with the distribution base and sets the at least a portion of the specifications of the distribution base by setting at least a part of items that characterize the virtual space, and the viewing control unit causes display, on the user terminal device of the user using the distribution base, a moving image expressing a state of viewing the video via the virtual monitor in the virtual space associated with the distribution base.

10. A video distribution control method applied to a video distribution system provided with a relay unit for relaying and distributing a video to be viewed which is distributed from a distribution source to a user terminal device used by each of a plurality of users, wherein the video distribution control method includes:

a step that obtains permission from the distribution source and sets up, on the relay unit, a distribution base as a unit for relaying and distributing the video to the user terminal device;

a step that relays and distributes the video from the distribution source to the user terminal device of a user via the distribution base used by the user; and a step that provides a user group sharing the distribution base with an opportunity to use a paid service via the user terminal device, wherein the step that relays and distributes the video sets up the distribution base such that at least a portion of specifications that characterize the distribution base are defined based on an instruction of a predetermined setter, and wherein same one distribution base is able to be shared by two or more users.

11. A non-transitory computer readable storage medium storing a computer program applied to a video distribution system provided with a relay unit for relaying and distributing a video to be viewed which is distributed from a distribution source to a user terminal device used by each of a plurality of users, wherein the computer program is configured to cause a computer of the video distribution system to function as:

a distribution base setup unit that obtains permission from the distribution source and sets up, on the relay unit, a distribution base as a unit for relaying and distributing the video to the user terminal device;

a viewing control unit that relays and distributes the video from the distribution source to the user terminal device of a user via the distribution base used by the user; and an opportunity providing unit that provides a user group sharing the distribution base with an opportunity to use a paid service via the user terminal device, wherein the distribution base setup unit sets up the distribution base such that at least a portion of specifications that characterize the distribution base are defined based on an instruction of a predetermined setter, and wherein same one distribution base is able to be shared by two or more users.

\* \* \* \* \*